US008739960B2

(12) United States Patent
Eschlbeck

(10) Patent No.: US 8,739,960 B2
(45) Date of Patent: Jun. 3, 2014

(54) METHOD AND DEVICE FOR DEFLECTING AND ALIGNING PIECE GOODS OR ARTICLES

(75) Inventor: Richard Eschlbeck, Vogtareuth (DE)

(73) Assignee: Krones AG, Neutraubling (DE)

(*) Notice: Subject to any disclaimer, the term of this patent is extended or adjusted under 35 U.S.C. 154(b) by 46 days.

(21) Appl. No.: 13/465,217

(22) Filed: May 7, 2012

(65) Prior Publication Data
US 2012/0279828 A1 Nov. 8, 2012

(30) Foreign Application Priority Data
May 6, 2011 (DE) .......................... 10 2011 050 185

(51) Int. Cl.
B65G 25/00 (2006.01)
(52) U.S. Cl.
USPC .......................................... 198/429; 198/433
(58) Field of Classification Search
USPC .................... 198/429, 431, 432, 433
See application file for complete search history.

(56) References Cited

U.S. PATENT DOCUMENTS

| 2,526,983 | A | * | 10/1950 | Wait | 198/429 |
|---|---|---|---|---|---|
| 2,687,797 | A | * | 8/1954 | Hirsch et al. | 198/433 |
| 2,951,574 | A | * | 9/1960 | Craig | 198/836.3 |
| 3,179,231 | A | * | 4/1965 | Craig | 198/433 |
| 3,534,872 | A | | 10/1970 | Roth et al. | |
| 4,724,947 | A | * | 2/1988 | Opperthauser | 198/433 |
| 5,069,594 | A | * | 12/1991 | Bott et al. | 414/412 |
| 5,842,557 | A | * | 12/1998 | Montemayor et al. | 198/418.1 |
| 6,202,827 | B1 | * | 3/2001 | Drewitz | 198/433 |
| 7,861,847 | B2 | * | 1/2011 | Fourney et al. | 198/433 |
| 2009/0208320 | A1 | * | 8/2009 | Wagner et al. | 414/814 |

FOREIGN PATENT DOCUMENTS

| DE | 12 38 834 A | 4/1967 |
|---|---|---|
| DE | 19 31 043 A | 1/1970 |
| DE | 19 07 123 | 9/1970 |
| DE | 3 219 015 A | 11/1983 |
| DE | 195 15 998 A1 | 11/1996 |
| DE | 10 2005 019 985 A1 | 11/2006 |
| EP | 0742 166 | 11/1996 |
| EP | 1 717 533 A2 | 11/2006 |
| FR | 2033328 | 12/1970 |
| GB | 104 3904 | 9/1966 |
| GB | 212 01 98 | 11/1983 |
| WO | WO 2010/138501 | 12/2010 |

* cited by examiner

Primary Examiner — Leslie A Nicholson, III
Assistant Examiner — Keith R Campbell
(74) Attorney, Agent, or Firm — Davidson, Davidson & Kappel, LLC

(57) ABSTRACT

A device and a method for deflecting and aligning goods, which are transported in at least two approximately parallel longitudinal rows, in a first conveying direction to a transfer and alignment unit, from where they are transported further in a second conveying direction perpendicular to the first conveying direction. The transfer and alignment unit is coupled with a stop that is movable in or against the first conveying direction. The stop, in the process of transferring the front transversal row of articles or piece goods to the transfer and alignment unit, is brought into a position that is aligned with the flush front or back side of the first transversal row of articles or piece goods or profiled according to the orientation of the front or back side of the first transversal row of articles or piece goods.

15 Claims, 15 Drawing Sheets

METHOD AND DEVICE FOR DEFLECTING AND ALIGNING PIECE GOODS OR ARTICLES

This claims the benefit of German Patent Application DE 10 2011 050 185.1, filed May 6, 2011 and hereby incorporated by reference herein.

The present invention relates to a method for deflecting and aligning piece goods, articles, and/or groups of articles or groups of piece goods. The invention further relates to a device for conveying, deflecting, and aligning piece goods, articles, and/or groups of articles or groups of piece goods.

When handling, conveying, or generally transporting piece goods such as packages, bundles, or the like, it is necessary to change the transport direction of the piece goods at some points of travel, for instance by deflecting them by a defined angle. Such a deflection operation can at the same time serve for realigning the piece goods.

BACKGROUND

Methods for assembling piece goods into a specified format and aligning them are already known from prior art. DE 32 19 015 A1, for instance, discloses a device for loading pallets. The device comprises a feed track for piece goods and a bearing element, where said bearing element passes over the pallets after receiving the piece goods and then, after propping them up by means of a transferable counterholder, deposits them by retreating in relation to said counterholder. This known device allows piece goods to be deposited in a specified placing position on pallets, but it does not make provisions for the further transport of containers after deflecting them while simultaneously aligning them.

In some applications, however, it is desirable to combine a deflection of articles, containers, or piece goods along a transport route with a one-sided alignment, so that the deflected goods are aligned flush on one side after deflection and prior to their further transport in a different direction, as this can be important for following transport and/or handling processes.

Such a desire for aligning the conveyed goods together with deflecting them may arise in particular during the phase of breaking up pallet layers when it comes to handling cuboid-shaped conveyed goods that were previously deposited and/or stacked with different orientations, so that after transfer to a means of conveyance such differently oriented goods will come to be transported side by side. As a consequence, any initially existing order of the conveyed goods will be broken up after the goods are deflected to a further means of conveyance, potentially resulting in problems during the following handling of the conveyed goods, for instance jam-ups due to unevenly spaced, irregular rows and/or goods being displaced more or less to the sides but having to be conveyed consecutively.

SUMMARY OF THE INVENTION

It is an object of the present invention to provide a method and a corresponding device for conveyance, deflection, and alignment device, where said method and device allow articles and/or article groups to be deflected and specifically aligned in such a way that it is possible to define what the alignment and orientation of the piece goods, articles, and/or groups of articles or groups of piece goods in relation to each other will be after the deflection operation step has taken place.

The present invention provides a method for the simultaneous deflection and alignment of piece goods, articles, and/ or groups of articles or groups of piece goods, whereby said piece goods or articles are arranged in at least two approximately parallel longitudinal rows nearly without or with only small spaces between the piece goods or articles, or else also with considerable spaces between each other, and where said rows are transported in a first conveying direction to a transfer and alignment unit. Typically, however, there will be three approximately parallel longitudinal rows of piece goods or articles that are spaced nearly without or with only small spaces between them and that are transported in the first conveying direction. The articles or piece goods may, of course, also have considerable spaces between them, either in individual longitudinal rows or in all of them. They may also be differently spaced, for instance in individual pallet layers that have been transferred onto the first horizontal conveyor.

A part of the articles or piece goods are transported further in aligned arrangement in a second conveying direction, which is approximately perpendicular to the first conveying direction, by means of the transfer and alignment unit. In order to attain this object, the transfer and alignment unit for transferring and aligning a front transversal row of the at least two, three, or more longitudinal rows of piece goods or articles transported side by side in the first conveying direction is coupled with a stop means that is movable in or against the first conveying direction, whereby said stop means, in the process of transferring the front transversal row of articles or piece goods to the transfer and alignment unit, is brought into a position that is either aligned with the flush front or back side of the first transversal row of articles or piece goods, or, as the case may be, profiled (if the stop means is composed of multiple parts) according to the orientation of the front or back side of the first transversal row of articles or piece goods. The transfer and alignment unit is subsequently brought into a defined, flush alignment with the second conveying direction by shifting it in parallel to the first conveying direction. Eventually, it is possible to transport the left-aligned or right-aligned row (as viewed in the Figures) of at least two consecutively arranged articles or piece goods further in the second conveying direction.

The stop means can optionally be composed of multiple parts across the width of the stream of articles or piece goods, whereby it is possible for the multiple sections to be movable independently from each other in or against the first conveying direction, as the case may be. Typically, the individual parts of the stop means are each coupled with the transfer and alignment unit, but movable in relation to said transfer and alignment unit in or against the first conveying direction. In order to enable adjusting the stop means to different sized articles or piece goods, it is also possible to provide the individual, movable parts of the stop means to be shiftable in a direction transverse to the first conveying direction, for instance by a one-time adjustment, which determines the position of the individual parts transversal to the first transport direction for handling a certain size of piece goods or articles. In the case of a product change, it is possible to readjust the setting, as the case may be.

In the instance of a multiple-part stop means it is furthermore possible to provide that the movable sections of the stop means are brought outside of the insertion area for moving the articles or piece goods, in parallel to the first conveying direction and after the transfer of the front transversal row of articles or piece goods of the stream of articles or piece goods onto the transfer and alignment unit is accomplished, this operation being performed in order to avoid collisions between the individual parts of the stop means and the transported front row of articles or piece goods, which, after the accomplished transfer, have been placed in a direction that is transversal to the first conveying direction.

It is possible for the stop means to be coupled, in particular slidably anchored, to the transfer and alignment unit, which is slidable or movable with or against the conveying direction. In this way, the stop means can be brought into a desired stop position or brought outside of the insertion area for moving the articles or piece goods, as required. The moving or sliding direction of the stop means is performed in parallel to the first conveyor. Alternatively, it is possible to fasten the stop means independently of the transfer and alignment unit to the device, for instance at a base section, or a section of the housing or wall or the like.

The single- or multiple-part stop means can be formed, for instance, by a rail or the like, which is slidable in parallel to the first conveying direction, with an additional positioning element or also several additional positioning elements protruding from it and said positioning element/elements being adjustable in order to allow an indented profiling, for instance, of the approaching transversal row of articles or bundles. The positioning element or elements can optionally be moved independently of the movement of the adjustable stop means. They can alternatively, however, also be fastened to the stop means and be adjustable in relation to the stop means in or against the first transport direction.

A further, alternative embodiment can moreover provide for at least one positioning element, or, where appropriate, several positioning elements, to be additionally adjustable in parallel to the second transport direction, preferably in movements relative to the stop means, for which no other such additional movement component is necessary. The positioning elements, which are, as the case may be, adjustable in parallel to the second conveying direction, can in this way be adapted to differently sized articles or bundles, so that the device according to the invention and the method according to the invention makes provisions for a wide, universal range of applications.

The articles, piece goods, and/or groups of articles or groups of piece goods can be formed by containers and/or groups of containers, for instance. Generally, the terms "article" or "article groups" chosen in the present description are understood to comprise all types of piece goods, boxes, bundles, etc. Therefore it is generally also possible to align and deflect containers, bottles, or bundles of containers or bundles of bottles by means of the method according to the invention and the device according to the invention. The present method and the present system can in this way be applied for article groups that are formed of several articles, such as strapped bundles or bundles wrapped in shrinking foil. According to the invention, it is possible to align several article groups with each other.

Also, provisions may be made for one or several article groups, which are not arranged together in one article group, to be aligned with each other and deflected by the method according to the invention and/or for one or several articles and article groups to be aligned and deflected. It is also possible for the method according to the invention and for the system according to the invention, for instance to allow for a deflection of articles and/or article groups by a deflection angle of approximately 90 degrees. Alternatively, the method and the system can also be used for deflections by an acute or a dull angle.

In the method according to the invention, a first horizontal conveyor is preferably used for transporting and moving the articles or piece goods in the first conveying direction, thus ensuring the intermittent conveying movement of the at least two approximately parallel rows of piece goods or articles that are spaced nearly without or with small spaces between them, with this conveying movement being adapted to the oscillating movements of the transfer and alignment unit in or against the first conveying direction. In this variant, the transfer and alignment unit is also designed as the second horizontal conveyor, which is moveable as a whole between a first position and a second position in or against the first conveying direction.

In the first position, the transfer and alignment unit is either spaced at a minimal distance from the first horizontal conveyor or it abuts immediately on the first horizontal conveyor, largely without forming a gap in between. In its second, variable position, it is possible to define the alignment of the second horizontal conveyor, so that the aligned articles or piece goods are in flush alignment for transfer to a third horizontal conveyor, which is located at a small distance in the second conveying direction, with said transfer being performed by means of a transfer and alignment unit, which serves as second horizontal conveyor, to the third horizontal conveyer, which then provides further transport of the left-aligned or right-aligned articles or piece goods.

The method according to the invention provides a straight conveyance path for aligning and/or deflecting the articles or article groups on the first means of conveyance in the first conveying direction. This first means of conveyance or the first horizontal conveyor allows to receive the articles or article groups, for instance from a pallet layer after depalletizing the articles or article groups stacked thereon, and to convey them, initially without changing the formation the articles or article groups had on the pallets. Since it is possible for the article groups to be of cuboid form and the pallet layer to contain article groups in different spatial orientations and/or with gaps or hollow spaces in between them according to the stacking pattern, as for instance in so-called chimney formations or pinwheel patterns, deflecting the entire pallet layer by, for instance, 90 degrees may cause problems with regard to an order or formation that is desired and/or required for further handling.

In the instance of a pinwheel pattern layer with a central hollow space, a deflection of 90 degrees, which will typically not apply to the entire layer, but rather, for instance, to the foremost conveyed row of article groups, will not result in neat left-aligned or right-aligned bundles for further transport. It is thus possible that, for instance, the outer article groups or bundles are conveyed in longitudinal direction on the first conveyor, while an intermediate article group may be aligned transversely in relation to said longitudinal direction, with the result that it may be possible to transport the row further continuously and without gaps after effecting the 90-degrees deflection, however without the deflected row being left-aligned, as is possibly desired. By conveying this row to a stop means prior to deflection, only a right-aligned row could be obtained.

Cuboid-shaped articles or piece goods can alternatively form pallet layers with alternating longitudinal and transversal alignment of the articles or piece goods and without any gaps in between. It is also possible to deflect and align such pallet layers in the manner mentioned, where in this instance a single-part stop means is sufficient to fulfill this purpose. According to the alignment of the articles or piece goods, they are either longer or shorter in the direction of transport, depending on whether the narrow sides or the long sides of the cuboid-shaped articles or piece goods are aligned in parallel to the first conveying direction. The adjustable stop means therefore needs to be locked further away or closer against the first conveying direction in order to ensure that each front transversal row of articles or piece goods is arranged with the back sides in the same flush alignment, ready for the following transfer to the third conveyor.

These shortcomings identified in the practice of transferring and deflecting articles and piece goods are corrected by the method according to the invention by means of using the first conveyance means or the first horizontal conveyor to move the articles or article groups to a transfer unit arranged downstream of the first conveyance means, said transfer unit being oscillatingly movable in parallel to the first direction of movement and further designed to serve as a second conveyance means, and with said transfer unit comprising one or more positioning means, which are adjustable transversely to the first direction of movement of the first conveyance means, thus providing a suitable stop effect and a suitable stop contour toward and against which the first conveyance means guides a defined number of articles or article groups, whereby these articles and/or article groups, which are transported to the transfer unit, are subsequently transferred and/or conveyed by said transfer unit to a third conveyance means or a third horizontal conveyor and further transported by the third conveyance means in a second direction of movement, which is approximately perpendicular to the first direction of movement. In this context it can be in particular that the articles, piece goods, and/or groups of articles or groups of piece goods are subjected to a third movement component while they are being transferred or conveyed from the transfer and alignment unit toward the third conveyance means, with said third movement component running parallel to the second direction of movement.

The steps of the method according to the invention can in particular proceed according to the following sequence. The articles or piece goods are first transported by means of the first horizontal conveyor in the first conveying direction toward the multi-part stop means cooperating with the transfer and alignment in its first position, until at least the front row of articles or piece goods has come up against the profiled, single-part or, as the case may be, multi-part stop means, and has been conveyed onto the initially stationary second horizontal conveyor of the transfer and alignment unit, after which operation the first horizontal conveyor is stopped. In the subsequent step, the transfer and alignment unit with the articles or piece goods thereon is brought from its first position into a definable, second position in parallel to the first conveying direction and approximately transversal to the second conveying direction with its second horizontal conveyor in a stationary state, whereby at the same time, shortly before, or immediately afterward, the single-part stop means or the individual parts of the multi-part stop means is or are shifted into a position parallel to the first conveying direction and outside of the insertion area for moving the articles or piece goods on the transfer and alignment unit.

Finally, the second horizontal conveyor of the transfer and alignment unit in its second position can start up and convey the left-aligned or right-aligned row of articles or piece goods on it in the second conveying direction onto the moving, third horizontal conveyor, which is in flush alignment with the transfer and alignment unit. After conveyance of all relevant articles or piece goods in the second conveying direction to the third horizontal conveyor, it is possible, in this manner, to return the transfer and alignment unit against the first conveying direction from its second position into its first position to the first horizontal conveyor and to stop the second horizontal conveyor at the same time. In addition, the single-part or multi-part stop means is preferably brought to its, possibly profiled, alignment position against the first conveying direction so that said means forms a stop for the articles or piece goods moved toward and against it. The first horizontal conveyor can then start up again for conveying another row of articles or piece goods that have now moved to the foremost row onto the transfer and alignment unit and toward and against the stop means, thus performing another cycle according to the above description and then any optional number of further cycles.

The conveyance, transfer, and deflection of piece good, articles, and/or piece good groups or article groups can, for instance, be performed according to the consecutive steps described in the following section. First, the articles or article groups, after having been conveyed there from a depalletizer or the like, are transported on the first conveyance means. A defined number of articles or article groups is transferred or conveyed in a first, straight direction of movement onto the transfer and alignment unit, which also serves as an intermittent, second conveyance means. The foremost continuous row of articles or article groups in the front is, for instance, typically passed onto the transfer unit, whereas the articles or article groups following without a gap will temporarily still remain on the first conveyance means. During this transfer process the transfer unit preferably abuts immediately on the end of the first conveyance means, thus as far as possible preventing a gap from forming between the two levels of conveyance.

After the desired number of articles or article groups has been transferred onto the transfer and alignment unit and against a mechanical stop, such as a rail or a crossbar, it is possible to stop the first conveyance means, at least for a short interval, in order to avoid pushing further articles or article groups onto the transfer unit, where they could otherwise adversely cause jam-ups. Next, it is expedient to move the transfer unit, which can be moved in or against the conveying direction of the first conveyance means, away from the edge of the first conveyance means by a defined distance, on the one hand in order to obtain an exactly flush conveyor connection to the third conveyance means, the conveyance direction of which is normally approximately perpendicular to the conveying direction of the first conveyance means.

On the other hand, the distance will prevent the articles or article groups standing on the transfer unit and shifted in a perpendicular movement in relation to the original conveying direction of the first conveyance means from being impaired or blocked by or from dragging along, distorting, or displacing the articles or article groups of the following rows still left on the momentarily stationary first conveyance means, as would happen in the instance of the articles or article groups of said already transferred rows and the rows still left coming into direct and/or partial contact with each other. The positioning means forms the stop for the transferred rows of articles or article groups, whereby the desired alignment of the articles or article groups for the following further transport in a perpendicular direction and for the transfer to the third conveyance means is already created on transferring the articles or article groups onto the transfer unit by the said positioning means being definably adjustable.

In order to avoid blockages resulting from contact, it is necessary that the stop or positioning means are then moved away from the articles or article groups, and afterward, the second horizontal conveyor or transport facility on the transfer and alignment can start up and transfer the articles to the immediately abutting third conveyance means, which preferably runs at a synchronous speed with the transfer unit and which can continue to transport the articles or article groups in the desired alignment, in particular left-aligned, to downstream handling equipment.

As mentioned above, the articles and/or article groups are transported on the first conveyance means toward the transfer unit located downstream from said first conveyance means in a first direction of movement and thus with at least one first movement component. The first conveyance means is a horizontal conveyor and can be designed in particular as a conveyor belt. Beside a belt system, it is possible to employ conveyance means with rollers, for instance, or conveyance equipment that is arranged slightly slanted. Other suitable conveyance means are also possible and therefore not explicitly mentioned here.

It is optionally possible to arrange one or more guiding elements in the area of the first conveyance means for guiding a number of articles and/or article groups side by side in defined paths on the first conveyance means. The guiding elements can, for instance, guide the articles and/or article groups in slightly V-shaped paths or arranged in parallel and spaced from each other. The guiding elements can be formed, for instance, by guide tracks and/or guide rails and/or bars that are suited for slightly pushing apart the articles, article groups, bundles, or piece goods, and in this way producing small gaps transversal to the first conveying direction between the individual rows of consecutively conveyed articles. The mentioned guiding elements can be designed in each case to be angularly adjustable and/or inclinable, where appropriate.

The piece goods, articles, and/or groups of articles or groups of piece goods being transported on the first horizontal conveyor can optionally have the same size and alignment, typically, however, they will have different alignments and different geometries.

The transfer and alignment unit comprises another conveyance means, here designated as second horizontal conveyor, which at least in parts transports the articles and/or article groups in a direction that is approximately perpendicular to the article transport and/or article group transport of the first conveyance means. The other or second conveyance means can be designed, for instance, as a relatively short conveyor belt, the length of which must at least correspond to the width of the first conveyance means at the level of conveyance in order to ensure interference-free article transport and seamless conveyor connection. Other embodiments are conceivable, wherein the article transport and/or article group transport of the other or second conveyance means runs at a dull or at an acute angle to the article transport and/or article group transport of the first conveyance means. It is in general possible for the first and the other or second conveyance means to alternate, with or without temporal interruptions, in moving the articles and/or article groups. Normally, however, it will be necessary to stop the first conveyance means as soon as the second conveyance means transfers the articles onto the third conveyance means in a right angle to the second conveying direction. Only after completing this transfer and after returning to close the gap between the first and the second conveyance means will it be expedient for the first conveyance means to continue its movement.

In this way and as mentioned, one variant of the method provides that the transfer and alignment unit receives articles and/or article groups from the first conveyance means and is then moved and/or shifted in parallel to the first direction of movement, after which the transfer and alignment unit, after conveying and/or transferring the articles and/or article groups to the third conveyance means, is moved and/or shifted toward the first conveyance means and counter the first direction of movement. The transfer and alignment unit is additionally shifted and/or moved between its first stop position for receiving articles and/or article groups from the first conveyance means and its, possibly adjustable, second stop position for transferring the articles and/or article groups to the third conveyance means. According to the above definition, the first stop position corresponds to the nearly gapless approach toward the first conveyance means, while the second stop position provides for a space between the two conveyance means and a nearly flush transfer to the third conveyance means. At least the first stop position remains unchanged and is determined by the construction of the device, while it is definitely possible for the second stop position to be variable and dependent on various parameters, for instance on the width of the article group, the position of the third conveyance means, or the desired alignment of articles on the third conveyance means, etc.

According to an important aspect of the method, the transfer and alignment unit comprises a stop means with one or more adjustable positioning means having stop contours, against which the first conveyance means guides a defined number of articles and/or article groups. The indented stop contour can, for instance, comprise or be formed as a contact surface, which is normally oriented in perpendicular to the first direction of movement. In the instance of there being two or more such positioning means, these can each have one stop contour. It is possible for the stop contours of several positioning means to be arranged in parallel to each other. Two or more positioning means can be designed to be adjustable selectively or synchronously, in and against the direction of the first movement component, and, if necessary, in parallel to each other. It is conceivable for the stop contours to be resiliently pliable on surface contact with an article and/or article group.

After having been guided against the stop means with its adjustable stop contour, the articles and/or article groups are transferred or conveyed from the transfer and alignment unit to the third conveyance means. The further transport of articles and/or article groups on the third conveyance means is performed with the second movement direction or movement component, which runs in perpendicular to the first movement direction or major movement component. In this context it can preferably be provided for the article transport and/or article group transport on the third conveyance means to run in perpendicular to the article transport and/or article group transport on the first conveyance means. Other, different variants for the transport directions of articles and/or article groups of the first, second, and third conveyance means are conceivable, for instance at a dull or an acute angle, where the articles and/or article groups of the first conveyance means have a movement component in perpendicular to the articles and/or article groups of at least the third conveyance means.

In the instance that the transfer and alignment unit comprises another conveyance means, it is possible for the article transport and/or article group transport of the other conveyance means and/or the article transport and/or article group transport of the third conveyance means to be guided in parallel or aligned directions. During transfer or conveyance from the transfer and alignment unit to the third conveyance means, the articles and/or article groups are in this case moved with a third movement direction or movement component, which runs in parallel to the at least one other movement direction or movement component. Furthermore it is possible that the speed, at which the third conveyance means transports articles and/or article groups, is approximately identical to the speed of the other or second conveyance means.

In the context of the present method according to the invention, two or more of the articles and/or article groups, which are transferred and/or conveyed to the third conveyance means, together form a flush outer edge extending in parallel to the second movement component or direction. The flush outer edge can, for instance, run vertical to the first movement component. The articles and/or article groups transported on the third conveyance means can move in the second transport direction, which runs in parallel to the flush outer edge. In the instance of the articles and/or article groups intended for deflection and alignment being homogeneously formed, two or more of the articles and/or article groups transferred to the third conveyance means can together form two flush outer edges, which run in parallel to each other in the direction of the second movement component. If the articles are, however, oriented differently from each other and/or are of different sizes, it is only possible to align one of the row's longitudinal edges, while the other longitudinal edge will feature an irregular or indented contour in the manner as determined by the indented stop means.

In order to achieve the above stated goal, the present invention furthermore proposes a device for conveying, deflecting, and aligning piece goods, articles, and/or groups of articles or groups of piece goods, with said device comprising a first horizontal conveyor for conveying the piece goods or articles in at least two approximately parallel longitudinal rows of piece goods or articles that are spaced nearly gapless or with small spaces between them in a first conveying direction to a transfer and alignment unit, which is designed to serve as a second horizontal conveyor and which is movable in parallel to the first conveying direction between two positions. The piece goods or articles are conveyed toward and against a single-part or multi-part stop means, which is movable in parallel to the first conveying direction, for aligning the articles or piece goods to be arranged with their front sides in flush alignment or with their back sides in flush alignment. Said device moreover comprises a third horizontal conveyor for transporting the left-aligned or right-aligned articles or piece goods further in the second conveying direction, which is oriented approximately perpendicular to the first conveying direction.

The stop means is designed either as one single, continuous part or from multiple parts, which are movable independently from each other in or against the first conveying direction, so that they can align the front and back sides of the front face side of the foremost row of articles or piece goods to be either flush or profiled. In addition, the transfer and alignment unit is designed as the second horizontal conveying means and can be moved as a whole between a first position and a second position in or against the first conveying direction. In the first position, the transfer and alignment unit is spaced at a minimal distance from the first horizontal conveyor, and it disposes, in its second, variable position, of a definable alignment means for true aligned transfer of the aligned articles or piece goods to a third horizontal conveyor located at a small distance in the second conveying direction. It is finally possible to activate or deactivate at least the first and the second horizontal conveyors in mutual coordination and/or depending on the transfer and alignment unit being in its first or second position.

Optionally, at least the first horizontal conveyor can be provided with sensor equipment for registering the current positions of articles or piece goods placed and conveyed on said horizontal conveyor. The second horizontal conveyor and/or the stop means and/or the third horizontal conveyor can also optionally be provided with sensors suitable for acquiring data on their operating conditions and/or for registering the current positions of articles or piece goods placed and conveyed thereon. Preferably this sensor equipment will transmit the signals to suitable processing equipment for controlling and coordinating the movement operations of the described components of the device so that interferences and collisions are prevented.

The device as described in the present invention thus comprises a stream system for articles or containers, said system being supplied with a control unit for linking the various consecutive movements and transport states of the components. It is possible to provide the control unit with default information on the arrangement and/or number and/or geometry of the articles or article groups intended for deflection and alignment. This can also include, for instance, an input unit for the user to enter the above mentioned settings. Furthermore, other acquisition equipment for registering optical or other physical effects can be operatively connected to the control unit to supply it with their sensor data. It is also reasonable to include an input unit as well as one or more pieces of optical or other acquisition equipment. The acquisition equipment is useful, for instance, for determining the exact point of time for the temporary stops of the conveyance means, for the oscillating movements of the transfer and alignment unit between its at least two end or stop positions, and for the control of the conveyance units of the second and/or third conveyance means.

Another reasonable embodiment can comprise at least one optical acquisition equipment for transmitting a signal to the control unit as soon as articles and/or article groups have been guided against the at least one stop means with its adjustable stop contour and/or as soon as the articles and/or article groups have passed through a registration area of the at least one optical acquisition device. The at least one optical acquisition equipment can be arranged in such a way that its registration area extends in the direction of the second movement component and across at least parts of the transfer unit. In this context it is, among others, reasonable for the movement of articles and/or article groups on the first conveyance means to be stopped on signal transmittance from the optical acquisition equipment to the control unit. It can also be provided that the one or more positioning means are moved away from the articles and/or article groups and/or that the transfer unit is moved and/or shifted along a defined guide path in the direction of the first movement component when a signal is transmitted from the optical acquisition equipment to the control unit.

It is additionally conceivable for another optical acquisition equipment piece to be arranged in the area of the third conveyance means, with said optical acquisition equipment being able to recognize the further transport of articles and/or article groups on the third conveyance means and, on recognition, to transmit a signal to the control unit. The control unit can be designed to cause the transfer unit to shift back and/or return against the first movement component on receiving the signal and/or to cause the positioning means to move or shift in the direction of the containers or articles arranged on the first conveyance means. It is moreover conceivable that the control unit activates a transport movement of articles and/or article groups on the first conveyance means after the transfer unit has been shifted back and/or returned and after the positioning means have been shifted in the direction of containers arranged on the first conveyance means. Thus, the control unit can be operatively connected with the first conveyance means in such a manner that the process of guiding the articles and/or article groups from the first conveyance means to the stop contour is carried out over a defined interval of time, which is determinable by the control unit according to the preset information and/or according to the shift of the at least one positioning means and/or according to the actual position of the transfer unit along the guide path.

Instead of or in addition to optical sensors, it is also conceivable to use acoustic and/or touch sensors in the context of the present invention. It is possible, for instance, that one or several of the positioning means are provided with touch sensors, which transmit a signal to the control unit in the occurrence of surface contact with an article and/or with an article group in order to accordingly control the conveyors and the transfer and alignment unit.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

Figure 1:
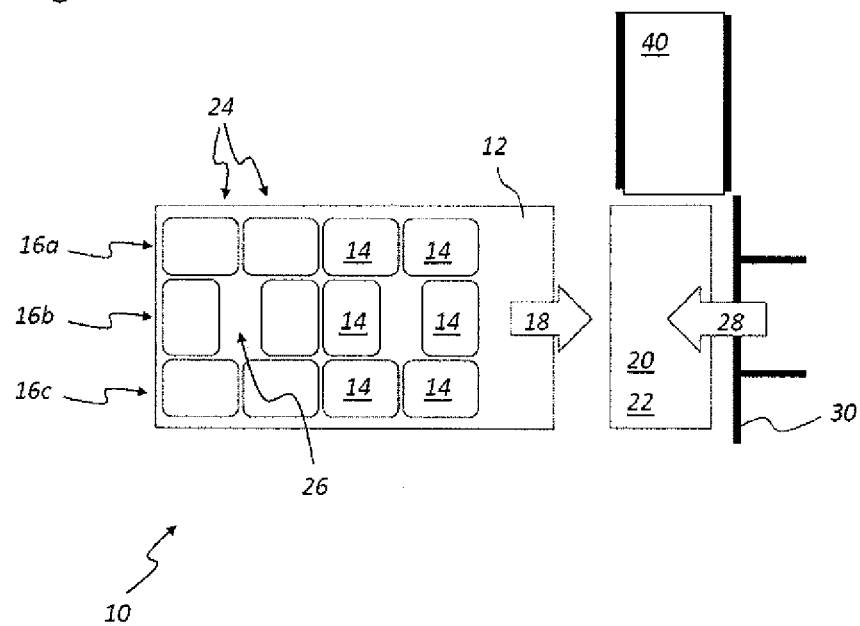
FIGS. 1 to 11 display several schematic representations of consecutive conveyance and alignment steps for bundles, piece goods, or articles according to a method according to the invention for deflecting and aligning piece goods, articles, and/or groups of articles or groups of piece goods.
Figure 2:
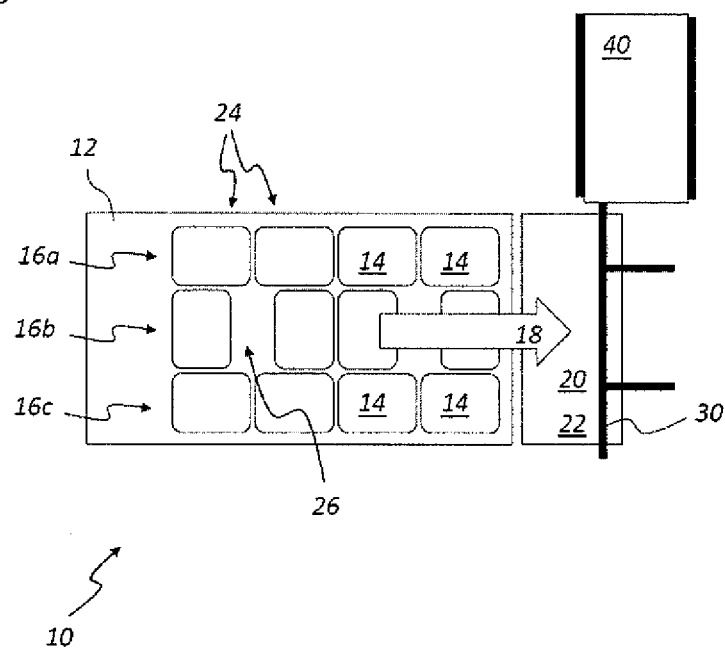

The same or equivalent elements of the invention are designated by identical reference characters. Furthermore and for the sake of clarity, only the reference characters relevant for describing the respective figure are provided. It should be understood that the detailed description and specific examples of the article flow system and method according to the invention, while indicating preferred embodiments, are intended for purposes of illustration only and are not intended to limit the scope of the invention.

The schematic representations of FIGS. 1 to 11 illustrate several consecutive phases of the essential procedural steps of a first variant of the method according to the invention for deflecting and aligning piece goods, articles, and/or groups of articles or groups of piece goods. The procedure is performed, for instance, with a device 10 for conveying, deflecting, and aligning piece goods, articles, and/or groups of articles or groups of piece goods, as illustrated in the FIGS. 1 to 14, which show the device in its essential functional elements that operate together in the manner described in the following passages.

The device 10 comprises a first horizontal conveyor 12, which serves for conveying piece goods, bundles, packages, or articles 14—all of which are collectively designated as articles 14 in the following—in a total of three parallel rows 16a, 16b, and 16c of articles 14 spaced at larger or smaller intervals to each other in a first conveying direction 18 to a transfer and alignment unit 22, which is designed as a second horizontal conveyor 20 and which is movable in parallel to the first conveying direction 18 between two positions. As illustrated in FIG. 1 by the presented exemplary embodiment, pallet layers 24 of a total of six cuboid-shaped, i.e. non-square articles 14, not all of them in the same alignment, are conveyed one after the other on the first horizontal conveyor 12. Thus, the outer articles 14 of the rows 16a and 16c located at the edge are each conveyed longitudinally oriented in the first conveying direction 18, while the two inner articles 14 of the middle row 16b are transversely oriented in relation to the first conveying direction 18. Although the pallet layers 24 each have a regular outer perimeter, the two inner articles 14 of the middle row 16b are nevertheless spaced at a relatively large distance from one another. Such a stacking pattern for a pallet layer 24 is also referred to as a pinwheel pattern, because the articles 14 are stacked similar to a pinwheel around a center, where a hollow space 26 forms.

In the illustration in FIG. 1, the second horizontal conveyor 20 or the transfer and alignment unit 22 is arranged in a position distanced from the front edge of the first horizontal conveyor 12, which position will be referred to as second position or as second stop position hereinafter. The arrow 28 illustrates a return movement of the transfer and alignment unit 22 against the first conveying direction 18 in the direction of the first horizontal conveyor 12, by which movement, according to FIG. 2, the transfer and alignment unit 22 is brought into the first position or its first stop position, with the gap between the first horizontal conveyor 12 and the second horizontal conveyor 20 being at a or reduced to a minimum.

Figure 3:
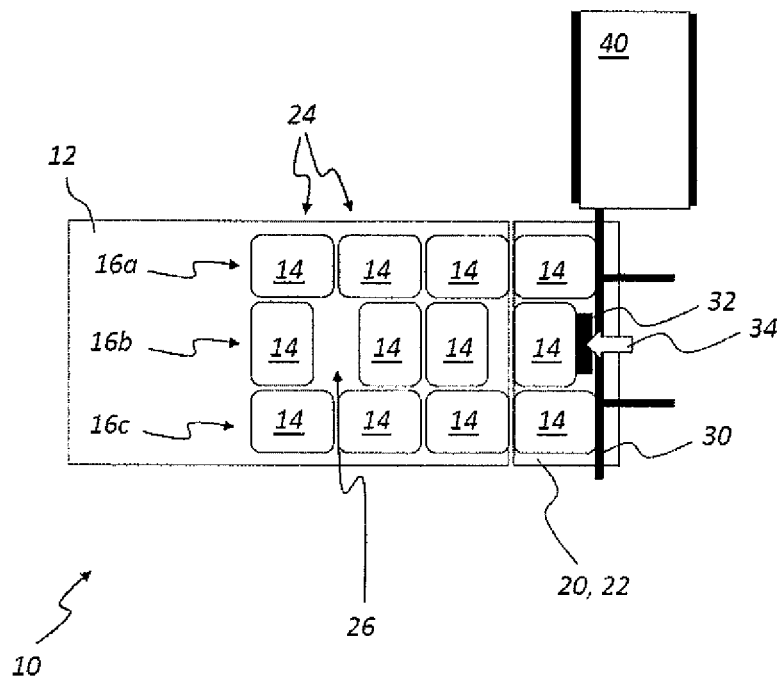
Figure 4:
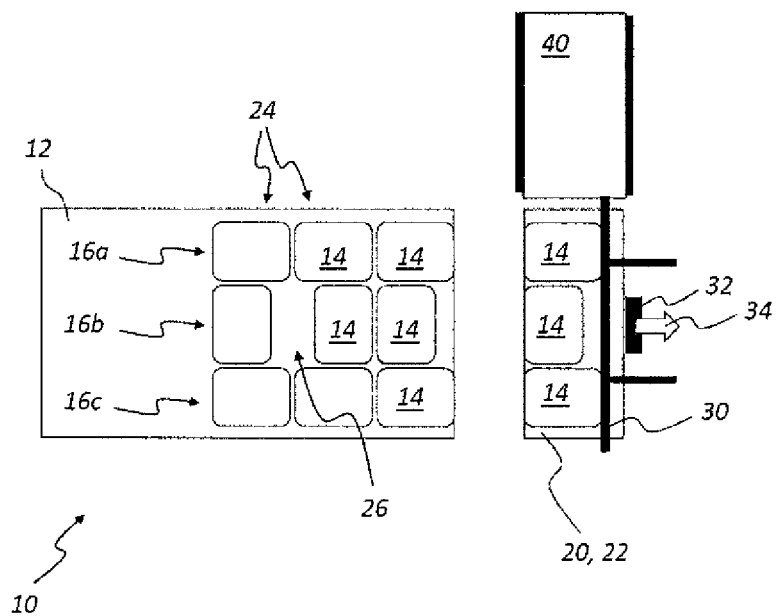
Figure 5:
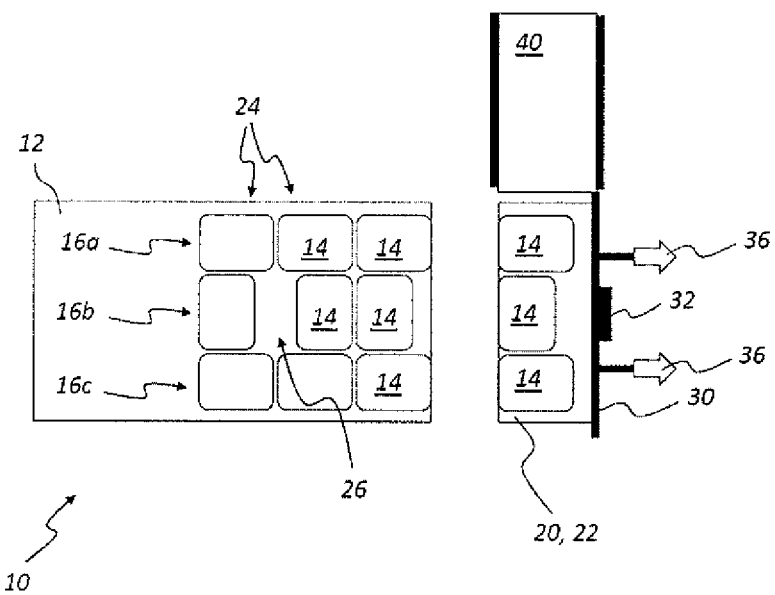

The illustration in FIG. 3 shows the operation of conveying the three foremost articles 14 in their side-by-side arrangement from the first horizontal conveyor 12 onto the second horizontal conveyor 20. The articles 14 are conveyed toward and against a multi-part stop means 30, which is movable in parallel to the first conveying direction 18, for aligning the articles 14 to be arranged with their back sides in flush alignment. The stop means 30 comprises an additional positioning element 32, which is also movably journaled in parallel to the first conveying direction 18. Optionally it is possible for the positioning element 32 to be journaled independently from or on the stop means 30, which can be designed as a crossbar or stopper plate or the like. In the procedural step shown in FIG. 3, the positioning element 32 is shifted left in the direction of the arrow 34 against the first conveying direction 18 and in this way protrudes from the surface level of the stop means 30, which forms an abutment for the articles 14. In order to align the articles 14 with flush back sides, it is necessary, as can be seen in FIG. 3, for the positioning element 32 to protrude from the surface level of the stop means 30 at least far enough to align the back long side of the middle article 14 in the front transversal row flush with the narrow sides of the two adjacent articles 14.

The lack of an arrow 18 in FIG. 3 indicates that the first horizontal conveyor 12 is momentarily stationary, because it is not possible to continue conveying further articles with the second horizontal conveyor 20 in its first position and the positioning element 32 extending from the positioned stop means 30. After the front transversal row of articles 14 has been transferred onto the transfer and alignment unit 22 as illustrated in FIG. 3, said transfer and alignment unit 22, together with the stop means 30, in the direction of the arrow 36 (cf. FIG. 5), and the positioning element 32, in the direction of the arrow 38 (cf. FIG. 4), is brought into the second position or stop position in parallel to the first conveying direction 18, where the second horizontal conveyor 20 is positioned to be largely aligned with a third horizontal conveyor 40, so that the left-aligned articles 14 can be transported further into the second conveying direction 42 (cf. FIG. 6), which is oriented perpendicular to the first conveying direction 18.

Figure 6:
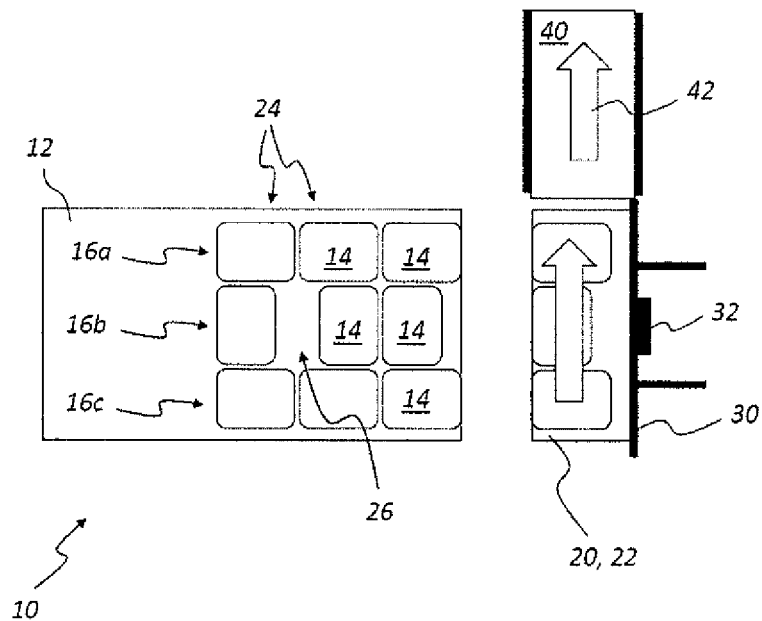
Figure 7:
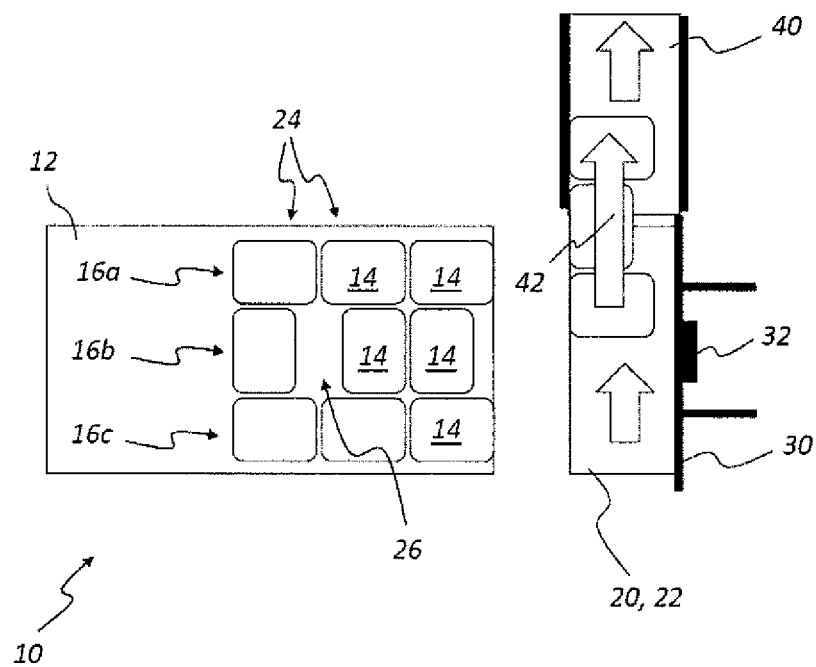
Figure 8:
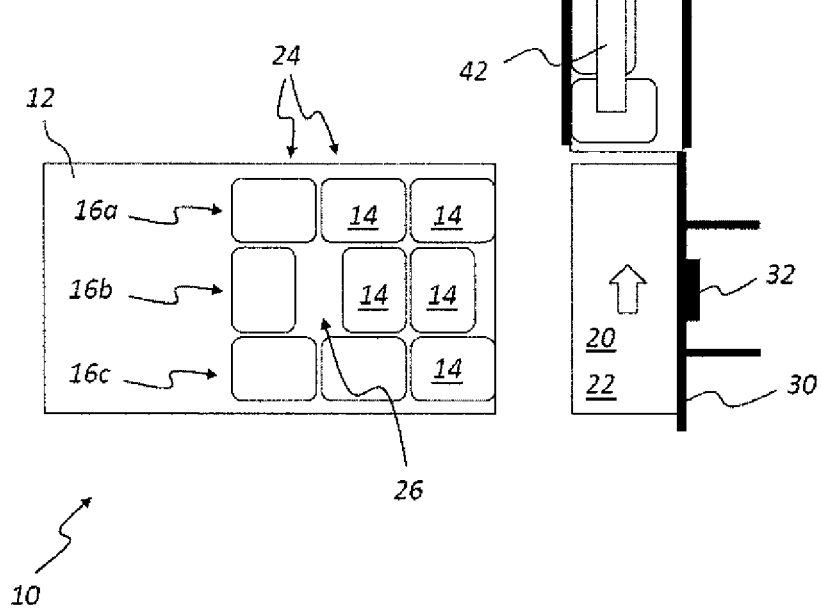
Figure 9:
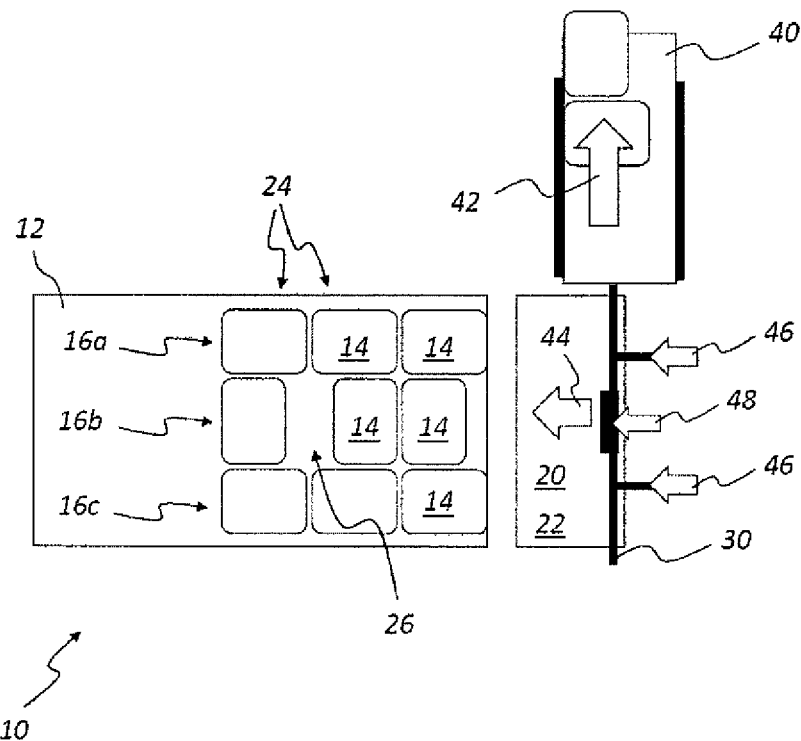

The illustration in FIG. 6 shows how the three articles 14, which are first positioned on the transfer and alignment unit 22, are moved further in the second conveying direction 42 and then, in a left-aligned orientation, are transferred one by one to the third horizontal conveyor 40 (cf. FIG. 7), from where they are further transported (cf FIG. 8). After complete transfer of the articles 14 onto the third horizontal conveyor 40, the transfer and alignment unit 22, with its second horizontal conveyor 20 deactivated, can be returned in direction of the arrow 44 and against the first conveying direction 18 to the first horizontal conveyor 12 (cf. FIG. 9). At the same time, the stop means 30 (in direction of the arrow 46) and the positioning element 32 (in direction of the arrow 48) are moved in the same direction. This movement can be performed coupled with the movement of the transfer and alignment unit 22, for instance.

Figure 10:
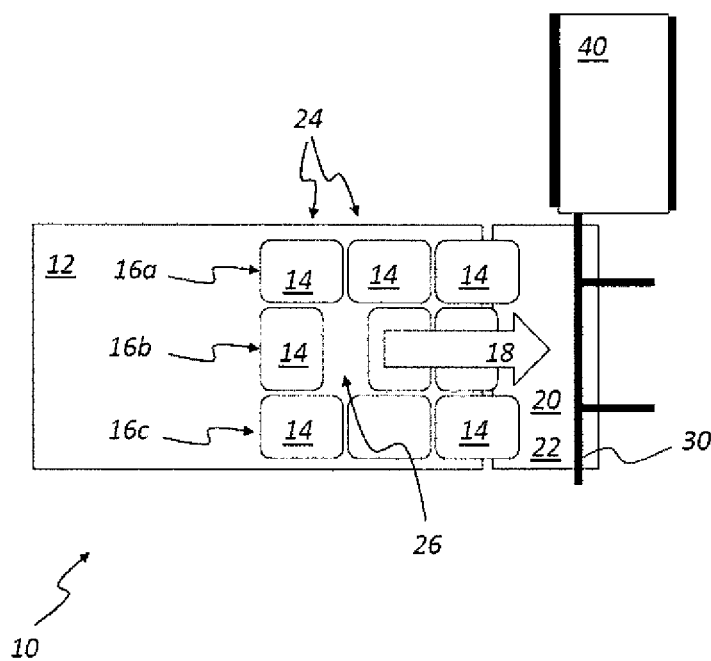
Figure 11:
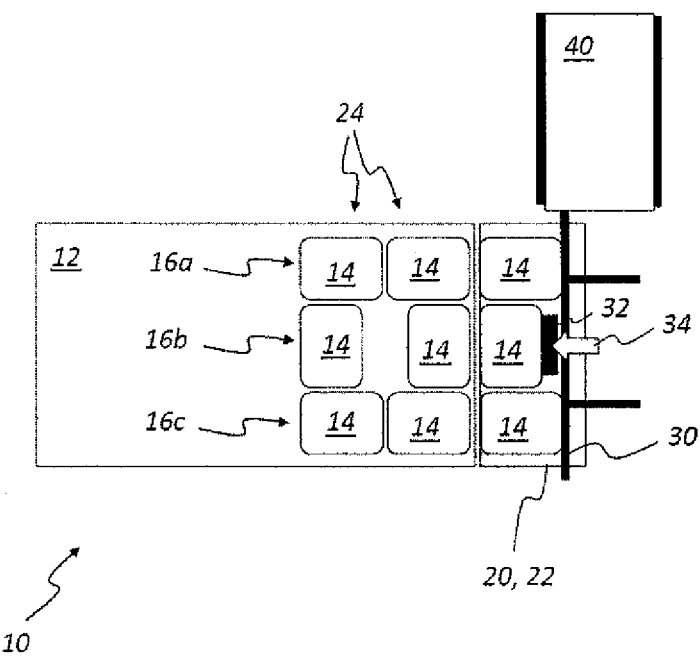

Afterward, the transfer operation as shown in FIGS. 1 to 9 is repeated, this time with the transversal row of articles 14 already aligned with flush back sides as illustrated in FIG. 10, so that it is not absolutely necessary to block the middle article 14 by extending the positioning element 32 in direction of the arrow 34, as shown in FIG. 11. It can, however, represent a useful safety precaution to position element 32 in the described manner in order to prevent the middle article 14 from being dragged along by the adjacent articles 14.

The schematic representations in FIGS. 12a to 12k display consecutive conveyance and alignment steps for bundles, piece goods, or articles 14 according to an alternative variant of the method according to the invention for deflecting and aligning piece goods, articles 14, or pallet layers 24 with articles 14. The device 10 comprises a first horizontal conveyor 12, which serves for conveying articles 14 in a maximum of four parallel rows 16a, 16b, 16c, and 16d of articles 14 spaced at larger or smaller intervals to each other in a first conveying direction 18 to a transfer and alignment unit 22, which is designed as a second horizontal conveyor 20 and which is movable in parallel to the first conveying direction 18 between two positions.

Figure 12A:
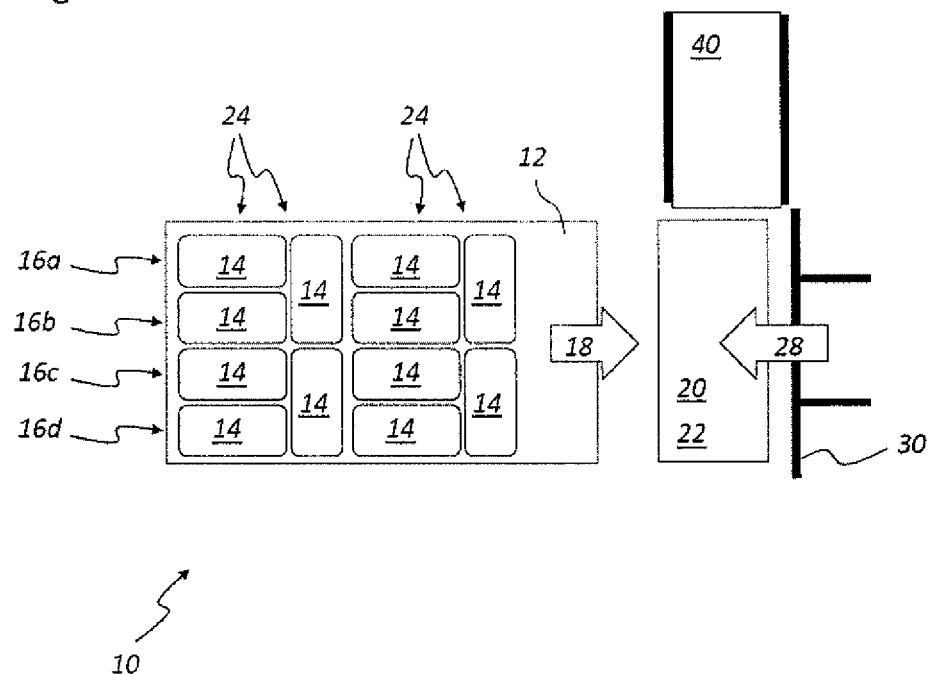
FIGS. 12a to 12k display several schematic representations of consecutive conveyance and alignment steps for bundles, piece goods, or articles according to an alternative variant of the method according to the invention for deflecting and aligning piece goods, articles, and/or groups of articles or groups of piece goods.
Figure 12B:
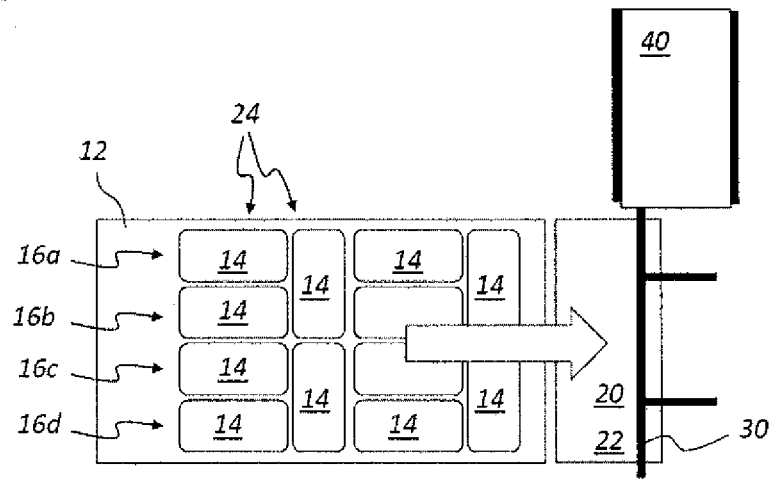
Figure 12B:

As is illustrated in FIG. 12a by the presented exemplary embodiment, pallet layers 24 of a total of six cuboid-shaped, i.e. non-square articles 14, not all of them in the same alignment, are conveyed one after the other on the first horizontal conveyor 12. In the front transversal row two articles 14 are in this way conveyed side by side, each with their long sides transversal and their narrow sides in parallel to the first conveying direction 18. These two articles 14 are followed by a total of four articles 14, rotated by 90°, so that they are conveyed, with their long sides touching, in a total of four parallel rows 16a, 16b, 16c, and 16d in the conveying direction 18. These articles 14, six in all, form a pallet layer 24. As illustrated by the FIGS. 12a to 12k, several of these pallet layers 24 are conveyed one after the other. In this way, approximately square pallet layers 24 are formed in each case without the central hollow space resulting from the pinwheel pattern as in the FIGS. 1 to 11.

In the illustration in FIG. 12a, the second horizontal conveyor 20 or the transfer and alignment unit 22 is arranged in a position distanced from the front edge of the first horizontal conveyor 12, which position is referred to as second position or as second stop position. The arrow 28 illustrates a return movement of the transfer and alignment unit 22 against the first conveying direction 18 in the direction of the first horizontal conveyor 12, by which movement, according to FIG. 12b, the transfer and alignment unit 22 is brought into the first position or its first stop position, with the gap between the first horizontal conveyor 12 and the second horizontal conveyor 20 being at a or reduced to a minimum.

Figure 12C:
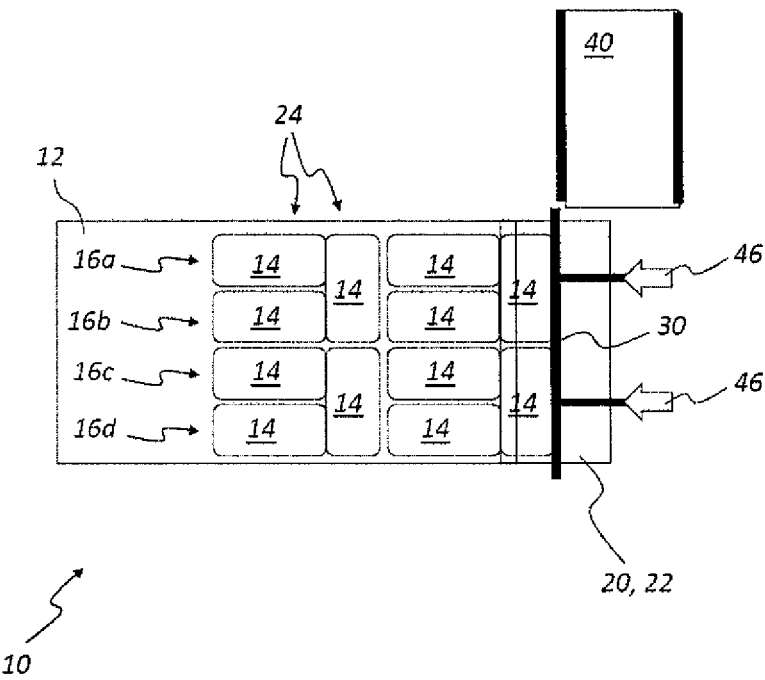
Figure 12C:
Figure 12D:
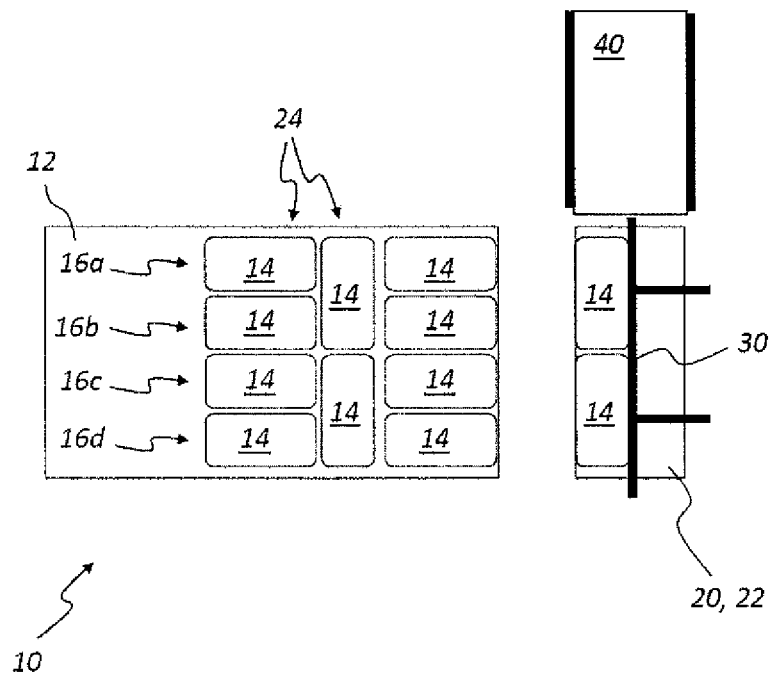
Figure 12E:
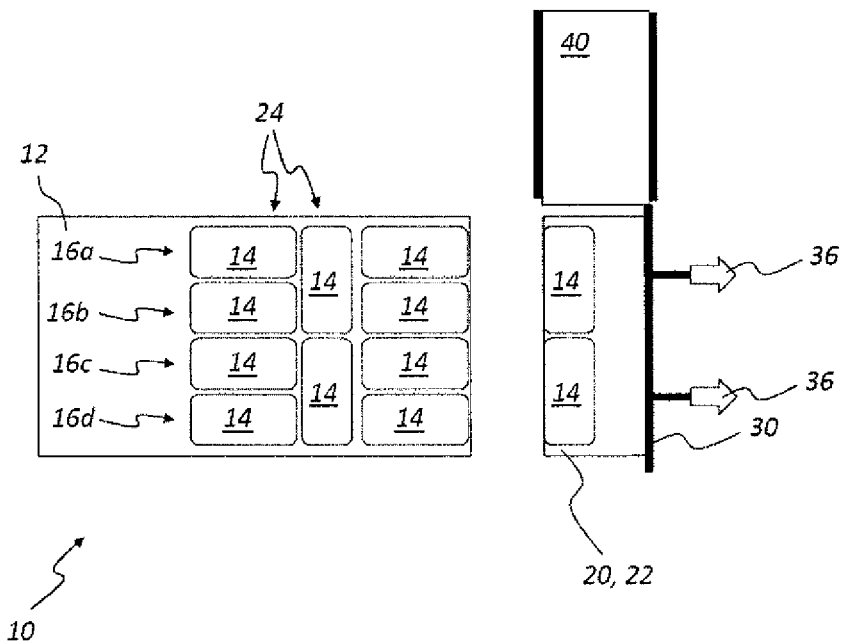

The illustration in FIG. 12c shows the operation of conveying the two foremost articles 14 in their side-by-side arrangement from the first horizontal conveyor 12 onto the second horizontal conveyor 20. The articles 14 are conveyed toward and against a single-part stop means 30, which is movable in parallel to the first conveying direction 18, for aligning the articles 14 to be arranged with their front and back sides each in flush alignment. The lack of an arrow 18 in FIG. 12c indicates that the first horizontal conveyor 12 is momentarily stationary and no longer conveying any articles 14, because it is not possible to continue conveying further articles with the second horizontal conveyor 20 in its first position and the stop means 30 put in position.

After transfer of the front transversal row of articles 14 onto the transfer and alignment unit 22 as illustrated in FIG. 12c, said transfer and alignment unit 22, together with the stop means 30, in the direction of the arrow 36 (cf. FIG. 12d and FIG. 12e), is brought into the second position or stop position in parallel to the first conveying direction 18, where the second horizontal conveyor 20 is positioned to be largely in alignment with a third horizontal conveyor 40, so that the flush aligned articles 14 can be transported further into the second conveying direction 42 (cf. FIG. 12f), which is oriented perpendicular to the first conveying direction 18.

Figure 12F:
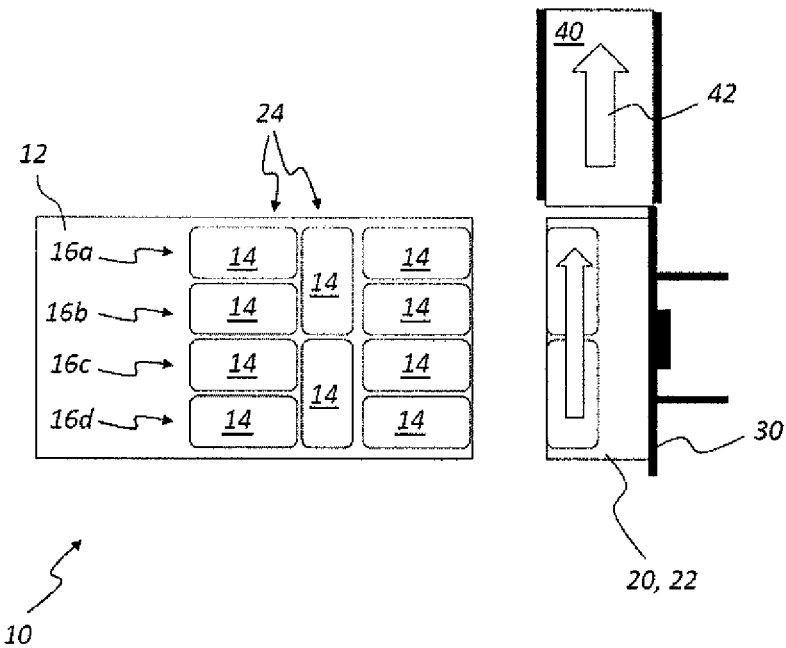
Figure 12G:
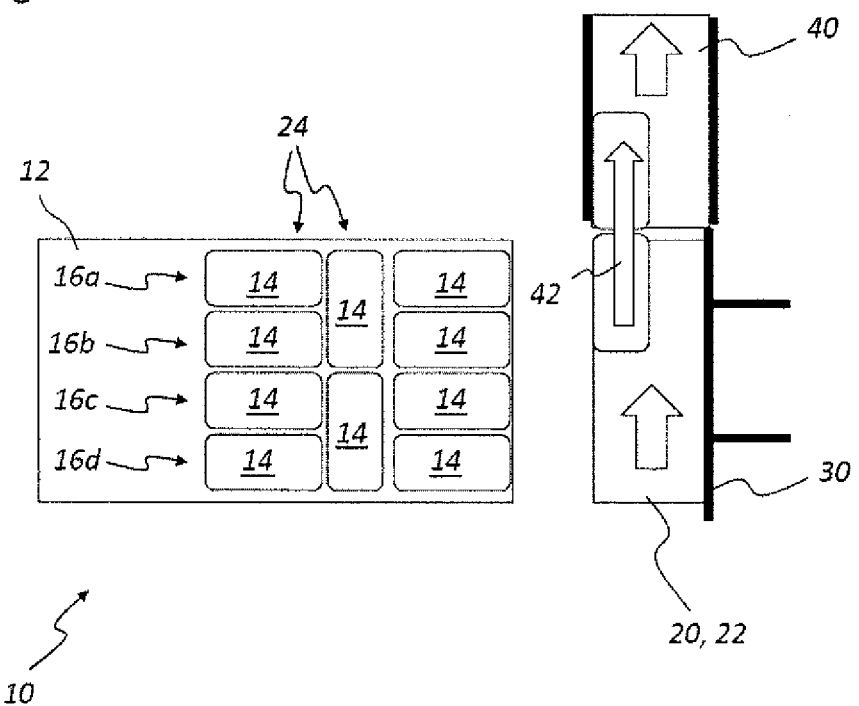
Figure 12H:
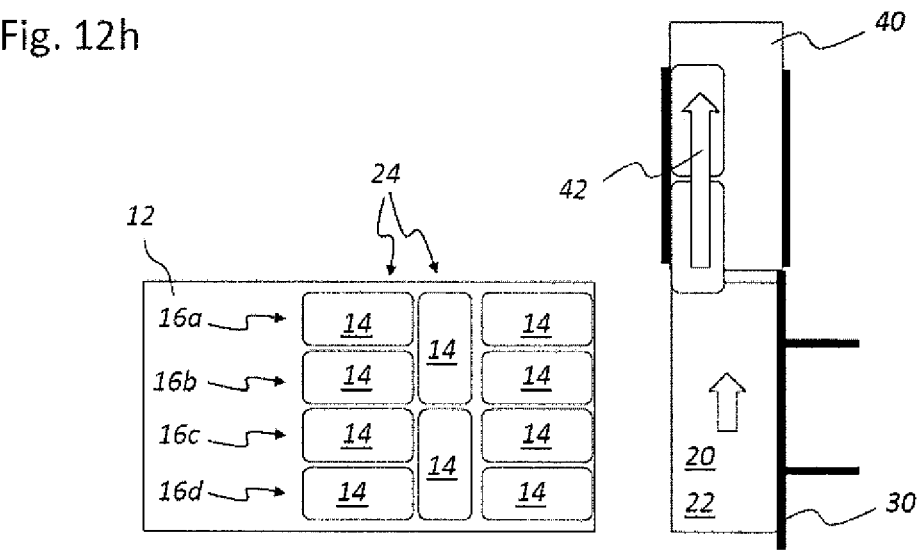
Figure 12I:
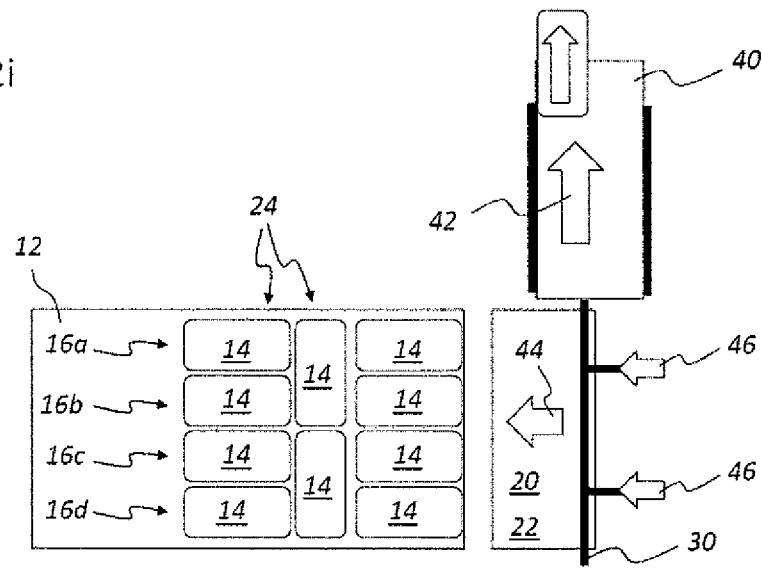

The illustration in FIG. 12f demonstrates how the two articles 14, which are first positioned on the transfer and alignment unit 22, are moved further in the second conveying direction 42 and then, in a left-aligned orientation, are transferred one by one to the third horizontal conveyor 40 (cf. FIG. 12g), from where they are further transported (cf FIG. 12h). After complete transfer of the articles 14 onto the third horizontal conveyor 40, the transfer and alignment unit 22, with its second horizontal conveyor 20 deactivated, can be returned in direction of the arrow 44 and against the first conveying direction 18 to the first horizontal conveyor 12 (cf FIG. 12i). At the same time, the stop means 30 (in direction of the arrow 46) is moved in the same direction. This movement can be performed coupled with the movement of the transfer and alignment unit 22, for instance.

Figure 12J:
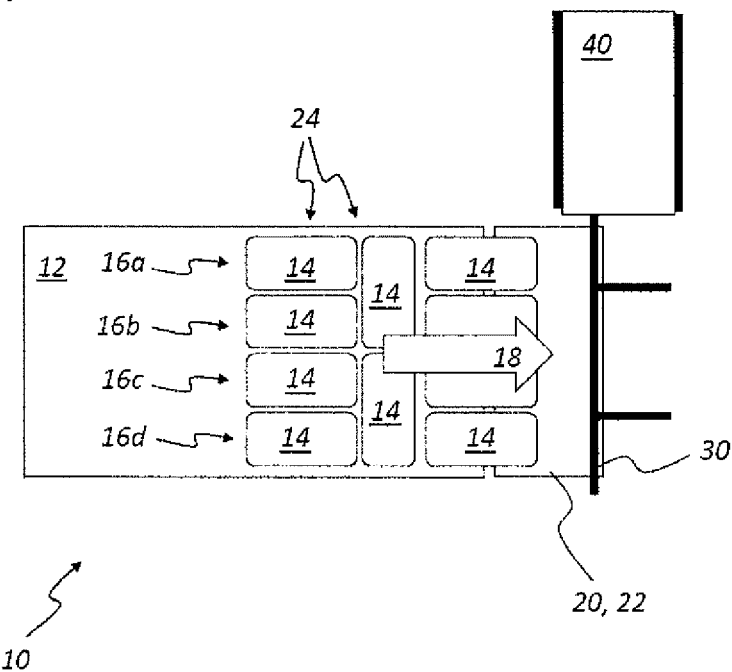
Figure 12K:
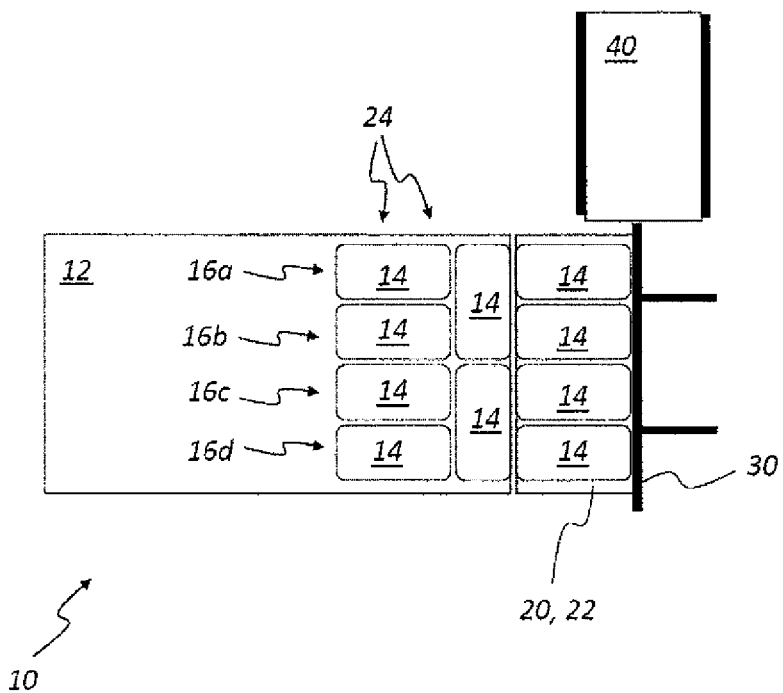

Afterward, the transfer operation as shown in the FIGS. 12a to 12i is repeated, this time with the transversal row of four articles 14 already in flush alignment as illustrated in FIG. 12j, so that they can be transferred as shown in FIG. 12k in four rows 16a, 16b, 16c, and 16d onto the transfer and alignment unit.

The schematic representations in FIGS. 13a to 13f display consecutive conveyance and alignment steps for bundles, piece goods, or articles according to a further alternative variant of the method according to the invention. The device 10 shown here also comprises a first horizontal conveyor 12, a second horizontal conveyor 20, and a third horizontal conveyor 40, which operate together in the manner described in the following passages to convey bundles 50, which are transported, for instance, after depalletizing and transfer to pallet layers 24, onto the first horizontal conveyor 12 in the first conveying direction 18. Here, the bundles 50 are also conveyed in a total of three parallel rows 16a, 16b, and 16c in the first conveying direction 18 to the second horizontal conveyor 20, which is movable in parallel to the first conveying direction 18 between two positions and which serves as transfer and alignment unit 22.

Figure 13A:
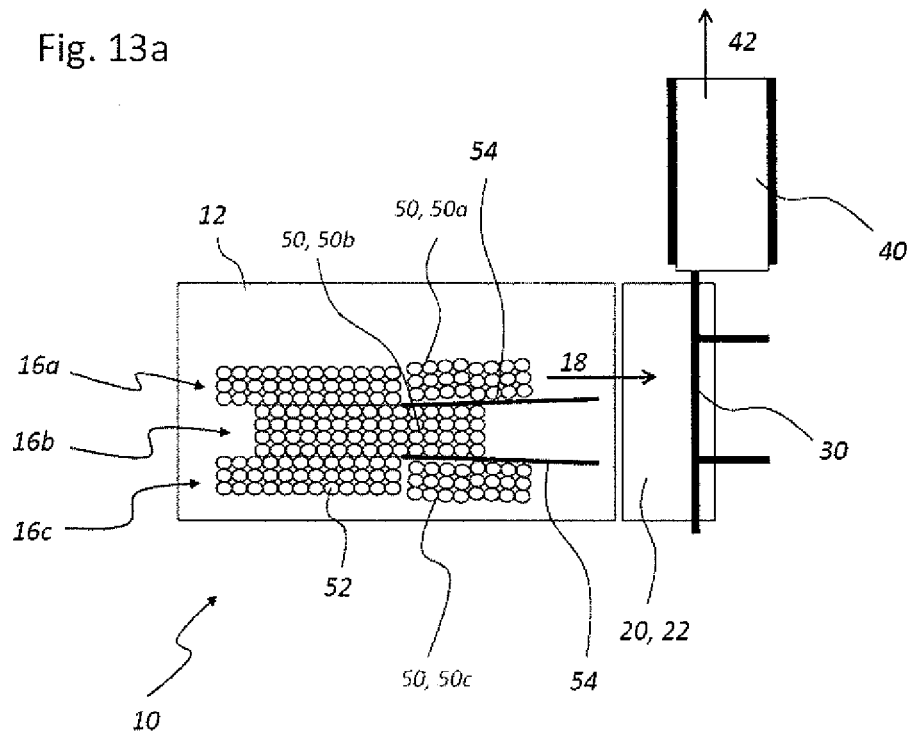
FIGS. 13a to 13f display several schematic representations of consecutive conveyance and alignment steps for bundles, piece goods, or articles according to a further variant of the method according to the invention for deflecting and aligning piece goods, articles, and/or groups of articles or groups of piece goods.

As is illustrated in FIG. 13a by the presented exemplary embodiment, pallet layers 24 of a total of six cuboid-shaped, i.e. non-square bundles 50, not all of them in the same alignment, are conveyed one after the other on the first horizontal conveyor 12. Thus, the outer bundles 50a and 50c of the rows 16a and 16c located at the edge are each conveyed longitudinally oriented in the first conveying direction 18, while the two inner bundles 50b of the middle row 16b are transversely oriented in relation to the first conveying direction 18. Although the pallet layers 24 each have a regular outer perimeter, the two inner bundles 50b of the middle row 16b are nevertheless spaced at a relatively large distance from one another. This stacking pattern with the hollow space 26 formed in the center between the bundles 50a, 50b, and 50c as in FIG. 13, is also referred to as a pinwheel pattern. As is also discernible from the illustrations in FIG. 13, each of the bundles 50 comprises a total of twelve round or cylindrical containers 52, which could be, for instance, beverage containers or cans or the like.

In contrast to the variant shown in the FIGS. 1 to 11, the device 10 in the second variant shown in FIG. 13 is represented with two guiding elements 54, which are arranged in the area of the first horizontal conveyor 12 and can be discerned as diverging in a V-shaped manner in transport direction 18, and which are intended to guide the bundles 50 in defined paths spaced slightly in transversal direction from each other, as can be seen in the following figures. By means of the two guiding elements 54, the bundles 50a of the top row 16a and the bundles 50c of the bottom row 16c are each slightly guided away from the middle row 16b with its undeflected bundles 50b in order to create the desired spaces in the second transport direction 42.

Figure 13B:
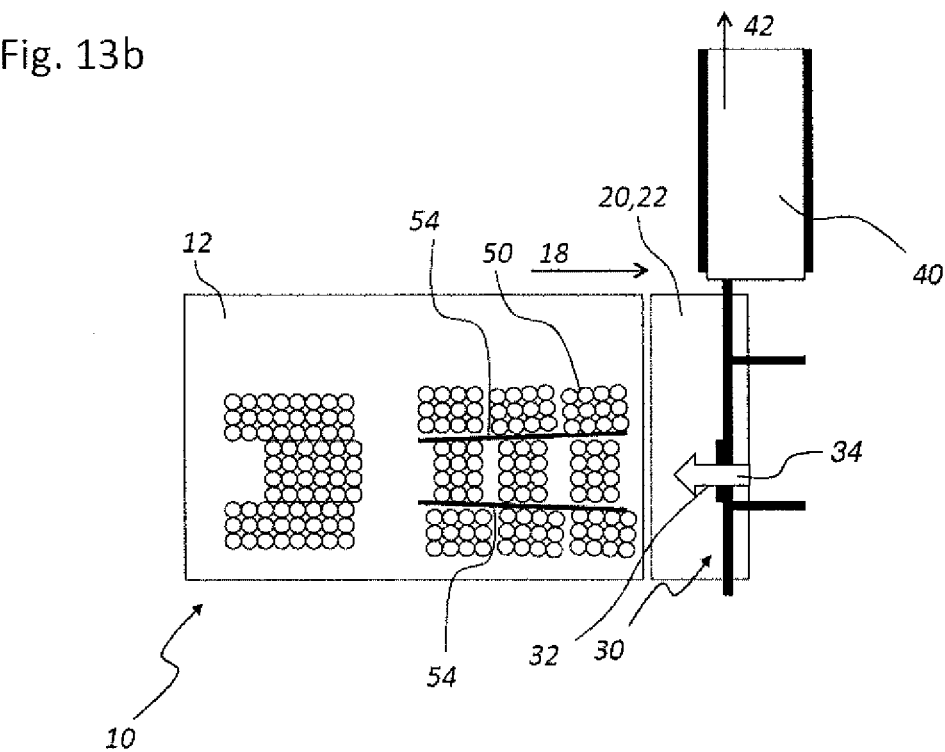

In the illustration in FIG. 13a, the second horizontal conveyor 20 or the transfer and alignment unit 22 is already arranged in a position abutting the front edge of the first horizontal conveyor 12, which position, in the present context, is referred to as first position or as first stop position of the second horizontal conveyor 20. A gap between the first horizontal conveyor 12 and the second horizontal conveyor 20 is thus minimized, enabling smooth transfer of the bundles 50 or 50a, 50b, and 50c being conveyed in the foremost transversal row. The illustration in FIG. 13b demonstrates the further transport of the bundles 50 on the first horizontal conveyor 12 and their approach toward the second horizontal conveyor 20. FIG. 13b additionally illustrates the beginning forward movement of the stop means 30 and of the positioning element 32 protruding from the surface level thereof in direction of the arrow 34.

Figure 13C:
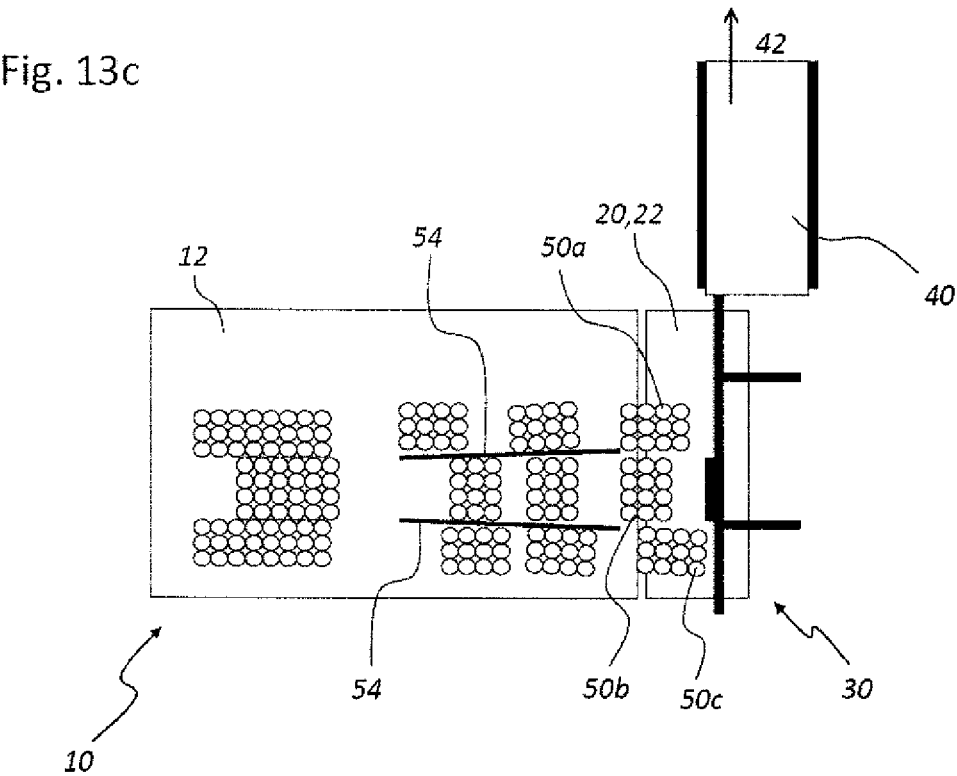

The illustration in FIG. 13c shows the transfer of the three foremost bundles 50a, 50b, and 50c in their side-by-side arrangement from the first horizontal conveyor 12 onto the second horizontal conveyor 20. According to FIG. 13d, the bundles 50 are conveyed against a multi-part, movable stop means 30 arranged in parallel to the first conveying direction 18 in order to align the bundles 50 with flush back sides or in left alignment 56 for the further transport of the bundles 50 in the second conveying direction 42. The stop means 30 in turn is provided with an additional positioning element 32, which is also movably journaled in parallel to the first conveying direction 18.

Figure 13D:
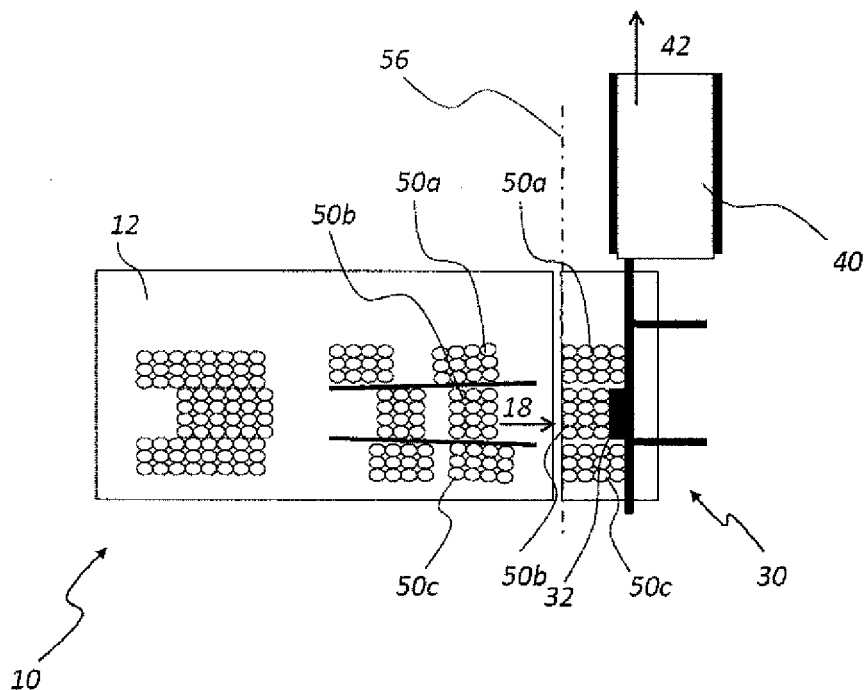

In the procedural step shown in FIG. 13d, the positioning element 32 is shifted toward the left against the first conveying direction 18 and in this way protrudes from the surface level of the stop means 30, which forms an abutment for the bundles 50. In order to align the bundles 50 with their back sides in flush alignment 56, it is necessary, as can be seen in FIG. 13d, for the positioning element 32 to protrude from the surface level of the stop means 30 at least far enough to align the back long side of the middle bundle 50b in the front transversal row flush with the narrow sides of the two adjacent bundles 50a and 50c.

Figure 13E:
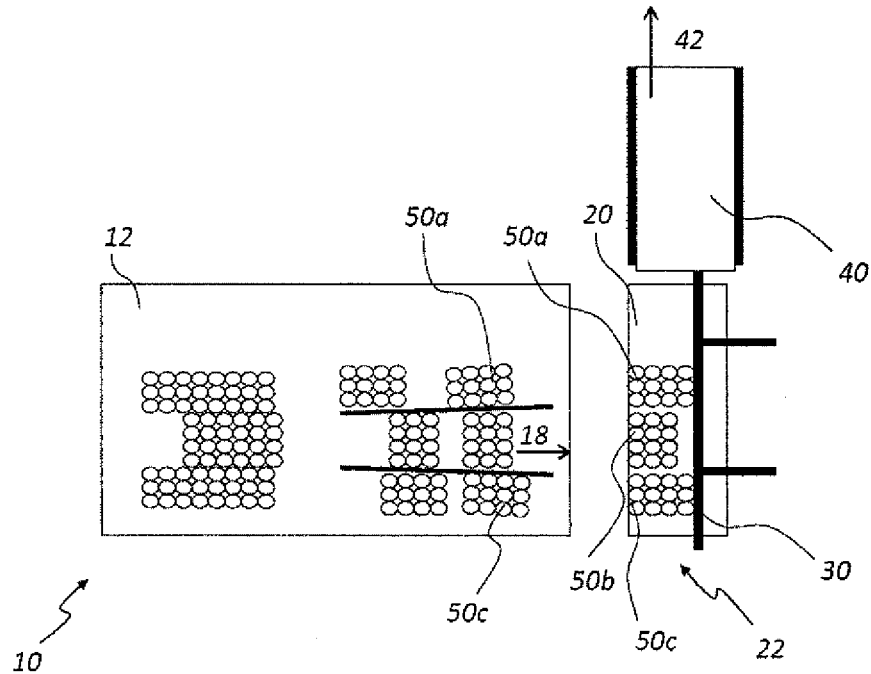

The lack of an arrow 18 in FIGS. 13c, 13d, and 13e indicates that the first horizontal conveyor 12 is momentarily stationary, because it is not possible to continue conveying further bundles with the second horizontal conveyor 20 in its first position and the positioning element 32 extending from the positioned stop means 30. After the front transversal row of bundles 50 has been transferred onto the transfer and alignment unit 22 as illustrated in FIG. 13d, said transfer and alignment unit 22 is shifted into the second position together with the stop means 30 (cf. FIG. 13e), where it is also necessary to remove the positioning element 32 from the insertion area with the middle bundle 50b, because said positioning element 32 would otherwise block the third bundle 50c on transporting the bundles 50 in the second conveying direction 42 according to FIG. 13f.

Figure 13F:
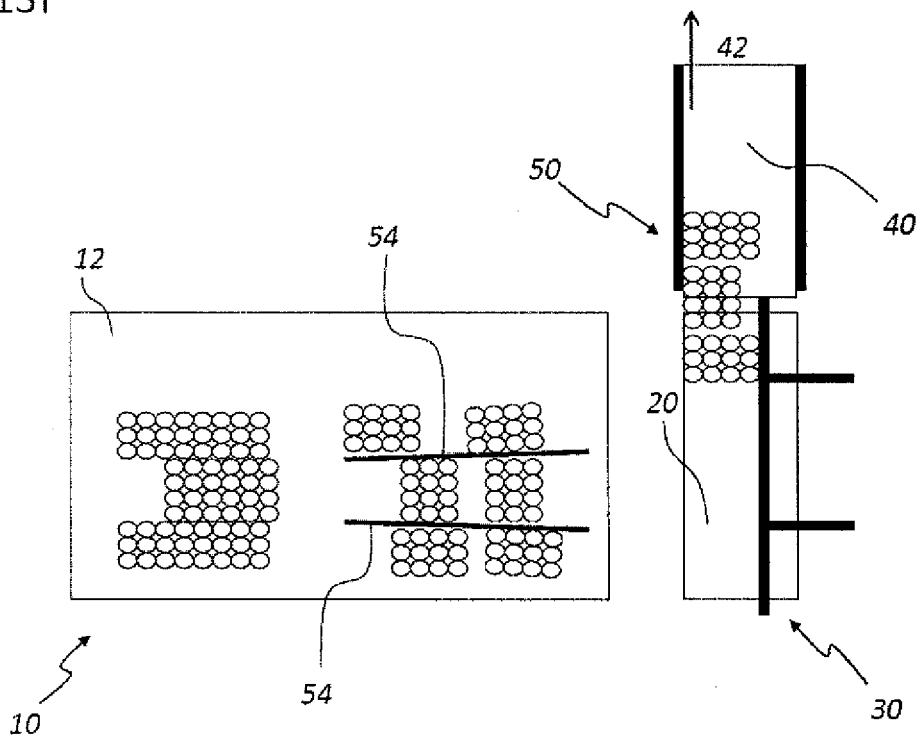

The illustration in FIG. 13f additionally shows how the three bundles 50, which are first positioned on the transfer and alignment unit 22, are moved further in the second conveying direction 42 and then, in left-aligned orientation 56, are transferred one by one to the third horizontal conveyor 40, from where they are further transported. After complete transfer of the bundles 50 onto the third horizontal conveyor 40, the transfer and alignment unit 22, with its second horizontal conveyor 20 deactivated, can be returned against the first conveying direction 18 to the first horizontal conveyor 12 (not illustrated here). At the same time, the stop means 30 and the positioning element 32 are moved in the same direction. This movement can be performed coupled with the movement of the transfer and alignment unit 22, for instance. Afterward, the transfer operation illustrated in FIGS. 13a to 13f is repeated.

Figure 14:
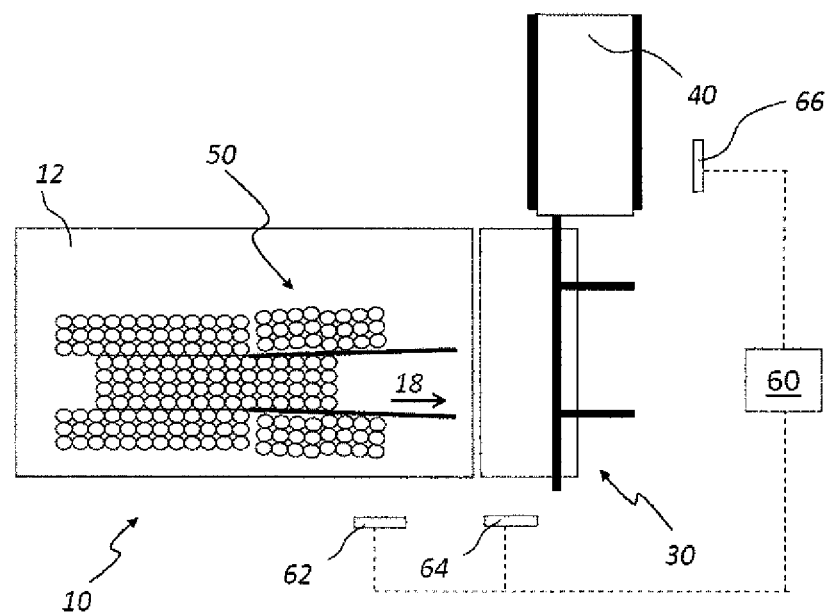
FIG. 14 displays a schematic representation of the operating mode of a combination of acquisition equipment and a control unit as can be employed in the method according to the invention and in a device according to the invention.

The schematic illustration in FIG. 14 shows the operating mode of a control unit 60, which is to be understood as an optional but very useful additional feature for realizing the desired precise control of the various components of device 10. The control unit 60 analyzes the signals of several acquisition equipment pieces 62, 64, and 66, with said equipment for instance each being composed of optical sensors for registering the movements of the bundles 50 or the pallet layers 24 and for controlling the conveyor belts 12, 20, and 40 according to the procedural steps of the conveyance operation. The first acquisition equipment 62 or the first sensor is allocated to the first conveyor belt or the first horizontal conveyor 12 and can provide for timed deactivation thereof, for instance, as soon as the following bundles 50 have reached the front edge.

The second acquisition equipment 64 can be allocated to the transfer and alignment unit 22 of the second horizontal conveyor 20, for instance, where it recognizes the completion of a transfer operation of a transversal row of bundles 50. The first conveyor belt 12 is stopped by means of the control unit 60 depending on the sensor data of the first sensor 62 and/or the second sensor 64, after which operation the transfer and alignment unit 22 is brought into its second stop position in transport direction 18. The second sensor or the third acquisition equipment 64 recognizes the completion of the transfer operation of the bundles 50 onto the third conveyor belt or the third horizontal conveyor 40, so that the control unit 60 can again control the process of conveyance, deflection, and transfer in a suitable manner.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Device for the Conveyance, Deflection, and Alignment of Piece Goods, Articles, etc.
12 First horizontal conveyor
14 Article
16a First row
16b Second row
16c Third row
16d Fourth row
18 First conveying direction
20 Second horizontal conveyor
22 Transfer and alignment unit
24 Pallet layer
26 Hollow space (created by stacking pattern)
28 Return movement, closing movement
30 Stop means
32 Positioning element
34 Direction of arrow, forward movement (positioning element)
36 Direction of arrow, return movement (stop means)
38 Direction of arrow, return movement (positioning element)
40 Third horizontal conveyor
42 Second conveying direction
44 Direction of arrow, forward movement (transfer- and alignment unit)
46 Direction of arrow, forward movement (stop means)
48 Direction of arrow, forward movement (positioning element)
50 Bundle
50a First bundle
50b Second bundle
50c Third bundle
52 Container
54 Guiding element
56 Left-aligned orientation
60 Control unit
62 First acquisition equipment
64 Second acquisition equipment
66 Third acquisition equipment

What is claimed is:

1. A method for deflecting and aligning piece goods, articles and/or groups of articles or piece goods transported in at least two approximately parallel longitudinal rows of piece goods or articles, either without spaces or with spaces between them, in a first conveying direction, the method comprising:
   conveying the piece goods or articles in a stream in the first conveying direction to a transfer and alignment unit;
   transporting the piece goods or articles further, in an aligned arrangement, in a second conveying direction approximately perpendicular to the first conveying direction, the transfer and alignment unit for transferring and aligning a front transversal row of the at least two longitudinal rows of piece goods or articles transported side by side in the first conveying direction, the transfer and aligning unit being coupled with a stop movable in or against the first conveying direction, the stop being composed of multiple parts across a width of the stream of articles or piece goods;
   bringing at least one section of the stop, during the process of transferring the front transversal row of articles or piece goods to the transfer and alignment unit, into a position or profile that is either aligned with a flush front side or a flush back side of the first transversal row of articles or piece goods; and
   bringing the transfer and alignment unit into a defined, flush alignment with the second conveying direction by shifting the transfer and alignment unit in parallel to the first conveying direction, a left-aligned or right-aligned row of at least two consecutively arranged articles or piece goods being transported further in the second conveying direction,
   wherein the multiple parts are movable in relation to the transfer and alignment unit in or against the first conveying direction, and with the stop being brought outside of an insertion area for moving the articles or piece goods in parallel to the first conveying direction and after transfer of the front transversal row of articles or piece goods of the stream of articles or piece goods onto the transfer and alignment unit.

2. The method as recited in claim 1 wherein the articles or piece goods are transported and moved in the first conveying direction on a first horizontal conveyor to ensure an intermittent conveying movement of the at least two approximately parallel longitudinal rows of piece goods or articles, which are spaced without or with spaces between them, the conveying movement being adapted to oscillating movements of the transfer and alignment unit in or against the first conveying direction.

3. The method as recited in claim 1 wherein the transfer and alignment unit is designed as a second horizontal conveyor moveable as a whole between a first position and a second position in or against the first conveying direction, the transfer and alignment unit being spaced at a minimal distance from the first horizontal conveyor in the first position, and disposed, in the second, variable position for aligned transfer of the aligned articles or piece goods to a third horizontal conveyor located at a minimal distance in the second conveying direction, the transfer of aligned articles or piece goods being performed by the transfer and alignment unit serving as the second horizontal conveyor and transferring to the third horizontal conveyer, which then provides further transport of the left-aligned or right-aligned articles or piece goods.

4. The method as recited in claim 1 wherein the articles or piece goods are transported by a first horizontal conveyor in the first conveying direction toward and against the stop, the stop being a multi-part stop cooperating with the transfer and alignment unit in a first position until at least the front row of articles or piece goods have come up against the profiled multi-part stop, and have been conveyed onto an initially stationary second horizontal conveyor of the transfer and alignment unit, after which operation the first horizontal conveyor is stopped.

5. The method as recited in claim 4 wherein the transfer and alignment unit with the articles or piece goods thereon is brought from the first position into a definable second position in parallel to the first conveying direction and approximately transversal to the second conveying direction with a second horizontal conveyor in a stationary state, and at the same time, individual parts of the multi-part stop are shifted into a position parallel to the first conveying direction and outside of an insertion area for moving the articles or piece goods that are placed on the transfer and alignment unit.

6. The method as recited in claim 5 wherein the second horizontal conveyor of the transfer and alignment unit in a second position starts up and conveys the left-aligned or right-aligned row of articles or piece goods placed on it in the second conveying direction onto a moving, third horizontal conveyor in flush alignment with the transfer and alignment unit.

7. The method as recited in claim 4 wherein the transfer and alignment unit is returned, against the first conveying direction, from a second position into the first position to the first horizontal conveyor after having completed transfer of all articles and piece goods placed on it and while stopping the second horizontal conveyor at the same time, the multi-part stop being brought to an alignment position, against the first conveying direction, to form a stop for the articles or piece goods moved toward and against it, and whereby the first horizontal conveyor starts up again for conveying another transversal row of articles or piece goods that have now moved to the foremost row onto the transfer and alignment unit and toward and against the stop.

8. A device for conveying, deflecting, and aligning piece goods, articles, and/or groups of articles or groups of piece goods, the device comprising:
a transfer and alignment unit;
a first horizontal conveyor for conveying the piece goods or articles in at least two approximately parallel longitudinal rows of piece goods or articles, either without spaces or with spaces between them, in a first conveying direction to the transfer and alignment unit, designed to serve as a second horizontal conveyor;
a single-part or multi-part stop, the transfer and alignment unit movable in parallel to the first conveying direction between two positions, toward and against the stop, the stop movable in parallel to the first conveying direction for aligning the articles or piece goods to be arranged with front sides in flush alignment or with their back sides in flush alignment; and
a third horizontal conveyor for transporting the left-aligned or right-aligned articles or piece goods further in a second conveying direction oriented approximately perpendicular to the first conveying direction,
wherein the stop is formed by multiple parts, the parts being movable independently from each other in or against the first conveying direction so that they can align the front and back sides of the front face side of the foremost transversal row of articles or piece goods to be flush or profiled.

9. The device as recited in claim 8 wherein the transfer and alignment unit is moveable as a whole between a first position and a second position in or against the first conveying direction, the transfer and alignment unit spaced at a minimal distance from the first horizontal conveyor in the first position and disposed, in its second, variable position, for aligned transfer of the aligned articles or piece goods to the third horizontal conveyor located at a minimal distance in the second conveying direction.

10. The device as recited in claim 9 wherein the at least the first and the second horizontal conveyors can be activated or deactivated in mutual coordination and/or depending on the transfer and alignment unit being in its first or second position.

11. The device as recited in claim 8 wherein at least the first horizontal conveyor is provided with sensors for registering current positions of articles or piece goods placed and conveyed on said horizontal conveyor.

12. A method for deflecting and aligning piece goods, articles and/or groups of articles or piece goods transported in at least two approximately parallel longitudinal rows of piece goods or articles, either without spaces or with spaces between them, in a first conveying direction, the method comprising:
conveying the piece goods or articles in a stream in the first conveying direction to a transfer and alignment unit;
transporting the piece goods or articles further, in an aligned arrangement, in a second conveying direction approximately perpendicular to the first conveying direction, the transfer and alignment unit for transferring and aligning a front transversal row of the at least two longitudinal rows of piece goods or articles transported side by side in the first conveying direction, the transfer and aligning unit being coupled with a stop movable in or against the first conveying direction, the stop being composed of a single part or of multiple parts across a width of the stream of articles or piece goods;
bringing at least one section of the stop, during the process of transferring the front transversal row of articles or piece goods to the transfer and alignment unit, into a flush or profiled position according to an alignment of a flush front side or a flush back side of the first transversal row of articles or piece goods; and
bringing the transfer and alignment unit into a defined, flush alignment with the second conveying direction by shifting the transfer and alignment unit in parallel to the first conveying direction, a left-aligned or right-aligned row of at least two consecutively arranged articles or piece goods being transported further in the second conveying direction,
wherein the articles or piece goods are transported by a first horizontal conveyor in the first conveying direction toward and against the stop, the stop being a multi-part stop cooperating with the transfer and alignment unit in a first position until at least the front row of articles or piece goods have come up against the profiled multi-part stop, and have been conveyed onto an initially stationary second horizontal conveyor of the transfer and alignment unit, after which operation the first horizontal conveyor is stopped.

13. The method as recited in claim 12 wherein the transfer and alignment unit with the articles or piece goods thereon is brought from the first position into a definable second position in parallel to the first conveying direction and approximately transversal to the second conveying direction with a second horizontal conveyor in a stationary state, and at the same time, individual parts of the multi-part stop are shifted into a position parallel to the first conveying direction and outside of an insertion area for moving the articles or piece goods that are placed on the transfer and alignment unit.

14. The method as recited in claim 13 wherein the second horizontal conveyor of the transfer and alignment unit in a second position starts up and conveys the left-aligned or right-aligned row of articles or piece goods placed on it in the second conveying direction onto a moving, third horizontal conveyor in flush alignment with the transfer and alignment unit.

15. The method as recited in claim 12 wherein the transfer and alignment unit is returned, against the first conveying direction, from a second position into the first position to the first horizontal conveyor after having completed transfer of all articles and piece goods placed on it and while stopping the second horizontal conveyor at the same time, the multi-part stop being brought to an alignment position, against the first conveying direction, to form a stop for the articles or piece goods moved toward and against it, and whereby the first horizontal conveyor starts up again for conveying another transversal row of articles or piece goods that have now moved to the foremost row onto the transfer and alignment unit and toward and against the stop.

* * * * *